US010133528B2

(12) United States Patent
Yamaguchi

(10) Patent No.: US 10,133,528 B2
(45) Date of Patent: Nov. 20, 2018

(54) INFORMATION PROCESSING APPARATUS, PRINTER, AND NON-TRANSITORY COMPUTER READABLE MEDIUM

(71) Applicant: FUJI XEROX CO., LTD., Tokyo (JP)

(72) Inventor: Hiroshi Yamaguchi, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 15/496,544

(22) Filed: Apr. 25, 2017

(65) Prior Publication Data

US 2018/0150271 A1 May 31, 2018

(30) Foreign Application Priority Data

Nov. 28, 2016 (JP) ................... 2016-230214

(51) Int. Cl.
| | | |
|---|---|---|
| G06F 3/12 | (2006.01) | |
| H04B 10/60 | (2013.01) | |
| H04B 10/85 | (2013.01) | |
| H04N 1/00 | (2006.01) | |
| H04N 1/44 | (2006.01) | |

(52) U.S. Cl.
CPC .......... *G06F 3/1268* (2013.01); *G06F 3/1203* (2013.01); *G06F 3/1222* (2013.01); *G06F 3/1238* (2013.01); *G06F 3/1286* (2013.01); *H04B 10/60* (2013.01); *H04B 10/85* (2013.01); *H04N 1/00411* (2013.01); *H04N 1/4406* (2013.01); *H04N 2201/0094* (2013.01)

(58) Field of Classification Search
CPC .. G06F 17/30244; G06F 3/017; G06F 3/0304; G06F 17/30; G06F 17/3025; G06F 17/30259; G06F 17/30274; G06F 17/30528; G06F 17/3079; G06F 17/30799; G06F 17/30805; G06F 17/30811; G06F 1/3203
USPC ..................................... 358/1.13, 1.14, 1.15
See application file for complete search history.

(56) References Cited

U.S. PATENT DOCUMENTS

| | | | |
|---|---|---|---|
| 9,706,126 B2* | 7/2017 | Cho | .................. H04N 5/23293 |
| 2002/0023215 A1* | 2/2002 | Wang | ..................... G06Q 20/00 |
| | | | 713/171 |
| 2005/0265731 A1 | 12/2005 | Keum et al. | |
| 2006/0279732 A1* | 12/2006 | Wang | ........................ G01J 3/02 |
| | | | 356/326 |
| 2010/0309510 A1* | 12/2010 | Hansen | ................. G06F 3/1203 |
| | | | 358/1.15 |
| 2013/0032634 A1* | 2/2013 | McKirdy | ............. A61B 5/0205 |
| | | | 235/375 |

(Continued)

FOREIGN PATENT DOCUMENTS

| | | | |
|---|---|---|---|
| JP | 2000-172469 A | 6/2000 | |
| JP | 2003-235081 A | 8/2003 | |

(Continued)

OTHER PUBLICATIONS

May 23, 2017 Office Action issued in Japanese Patent Application No. 2016-230214.

*Primary Examiner* — Negussie Worku
(74) *Attorney, Agent, or Firm* — Oliff PLC

(57) ABSTRACT

An information processing apparatus includes a detector and a receiver. The detector detects a person. The receiver receives optical communication. The receiver does not accept reception of the optical communication when no person is detected by the detector.

12 Claims, 18 Drawing Sheets

(56) References Cited

U.S. PATENT DOCUMENTS

| | | | |
|---|---|---|---|
| 2013/0057894 A1* | 3/2013 | Narushima | G03G 15/5004 358/1.14 |
| 2013/0063646 A1* | 3/2013 | Ueno | G03B 21/142 348/333.1 |
| 2013/0182614 A1* | 7/2013 | Kumar | H04L 63/0428 370/255 |
| 2014/0118294 A1* | 5/2014 | Yamada | G06F 3/0487 345/174 |
| 2014/0157031 A1 | 6/2014 | Aoyagi | |
| 2014/0218765 A1 | 8/2014 | Sawayanagi et al. | |
| 2014/0340227 A1* | 11/2014 | Reed, Jr. | A61B 5/6889 340/573.1 |
| 2015/0085313 A1* | 3/2015 | Hashimoto | H04N 1/00891 358/1.14 |
| 2015/0092233 A1* | 4/2015 | Park | G06F 3/1288 358/1.15 |
| 2015/0103365 A1 | 4/2015 | Baba | |
| 2015/0105125 A1* | 4/2015 | Min | G04G 21/04 455/566 |
| 2015/0185807 A1* | 7/2015 | Okuzono | G06F 1/3231 713/320 |
| 2015/0186088 A1 | 7/2015 | Iwashima | |
| 2015/0234624 A1* | 8/2015 | Nii | G06F 3/1238 358/1.14 |
| 2015/0309761 A1 | 10/2015 | Hirakawa | |
| 2016/0277877 A1* | 9/2016 | Tsunoda | H04W 4/80 |
| 2017/0007917 A1* | 1/2017 | Back | A63F 9/24 |
| 2017/0013153 A1* | 1/2017 | Shin | H04W 76/10 |
| 2017/0039434 A1 | 2/2017 | Shima et al. | |
| 2017/0060503 A1* | 3/2017 | Tomihisa | G06F 3/1238 |
| 2017/0112430 A1* | 4/2017 | Hampton | A61B 5/4803 |
| 2018/0025350 A1* | 1/2018 | Grossman | G06Q 20/36 |
| 2018/0082392 A1* | 3/2018 | Miller | G06Q 50/2053 |

FOREIGN PATENT DOCUMENTS

| | | |
|---|---|---|
| JP | 3480734 B1 | 12/2003 |
| JP | 2004-248128 A | 9/2004 |
| JP | 2005-313551 A | 11/2005 |
| JP | 2005-341595 A | 12/2005 |
| JP | 2006-166373 A | 6/2006 |
| JP | 2007-053424 A | 3/2007 |
| JP | 2007-164400 A | 6/2007 |
| JP | 2007-189348 A | 7/2007 |
| JP | 2008-040807 A | 2/2008 |
| JP | 2008-186161 A | 8/2008 |
| JP | 2008-186402 A | 8/2008 |
| JP | 2008-245231 A | 10/2008 |
| JP | 2009-005079 A | 1/2009 |
| JP | 2009-286161 A | 12/2009 |
| JP | 2010-114492 A | 5/2010 |
| JP | 2010-130603 A | 6/2010 |
| JP | 2010-187259 A | 8/2010 |
| JP | 2014-007624 A | 1/2014 |
| JP | 2014-098894 A | 5/2014 |
| JP | 2014-110017 A | 6/2014 |
| JP | 2014-150474 A | 8/2014 |
| JP | 2014-180792 A | 9/2014 |
| JP | 2015-024626 A | 2/2015 |
| JP | 2015-126504 A | 7/2015 |
| JP | 2015-156109 A | 8/2015 |
| JP | 2015-210592 A | 11/2015 |
| JP | 2015-210597 A | 11/2015 |
| JP | 2016-140091 A | 8/2016 |
| WO | 2004/054812 A1 | 7/2004 |

\* cited by examiner

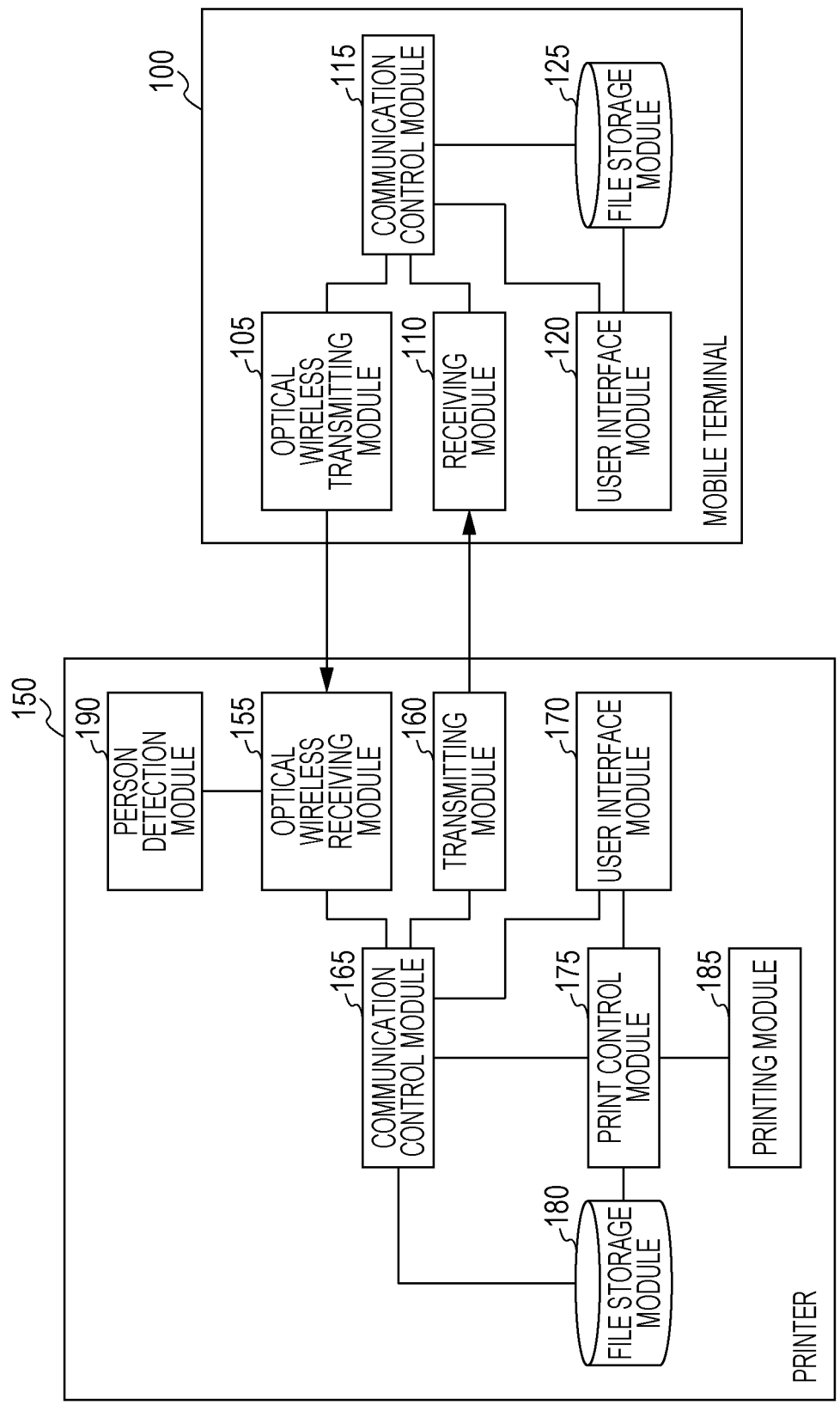

FIG. 2A
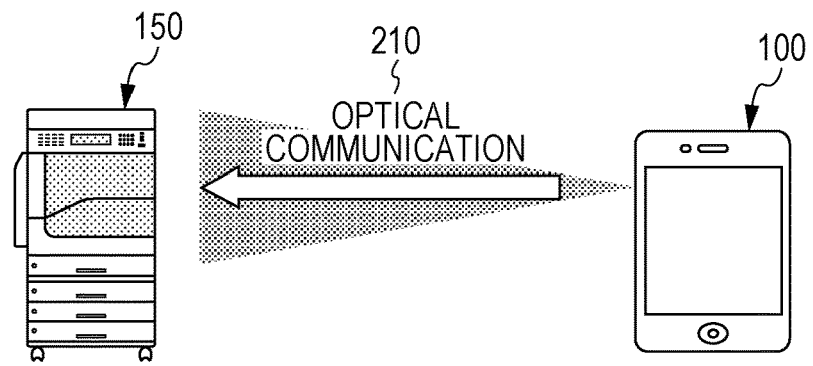
FIG. 2B1
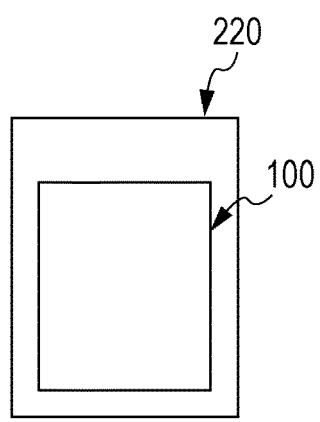
FIG. 2B2
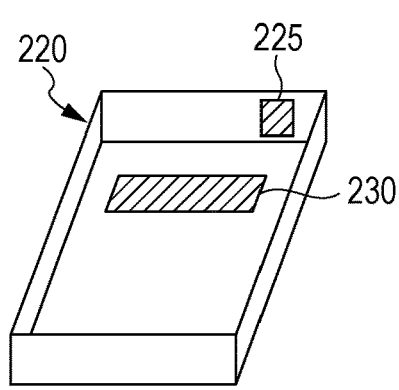
FIG. 2B3
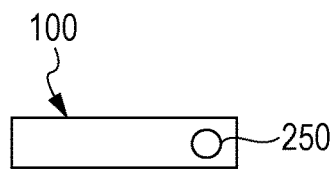
FIG. 2B4
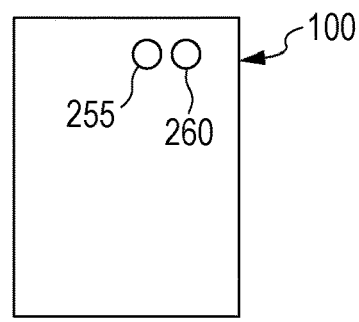

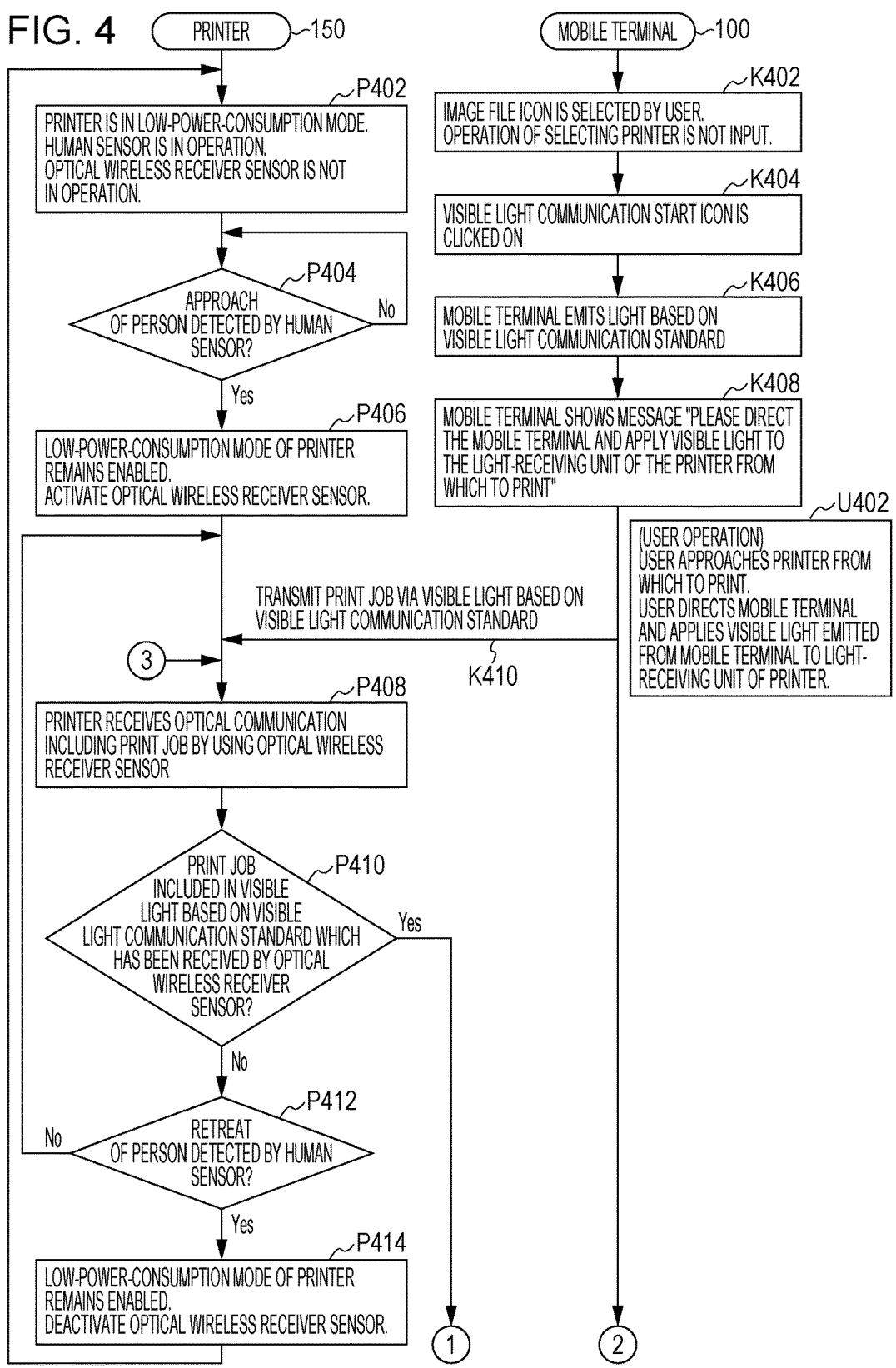

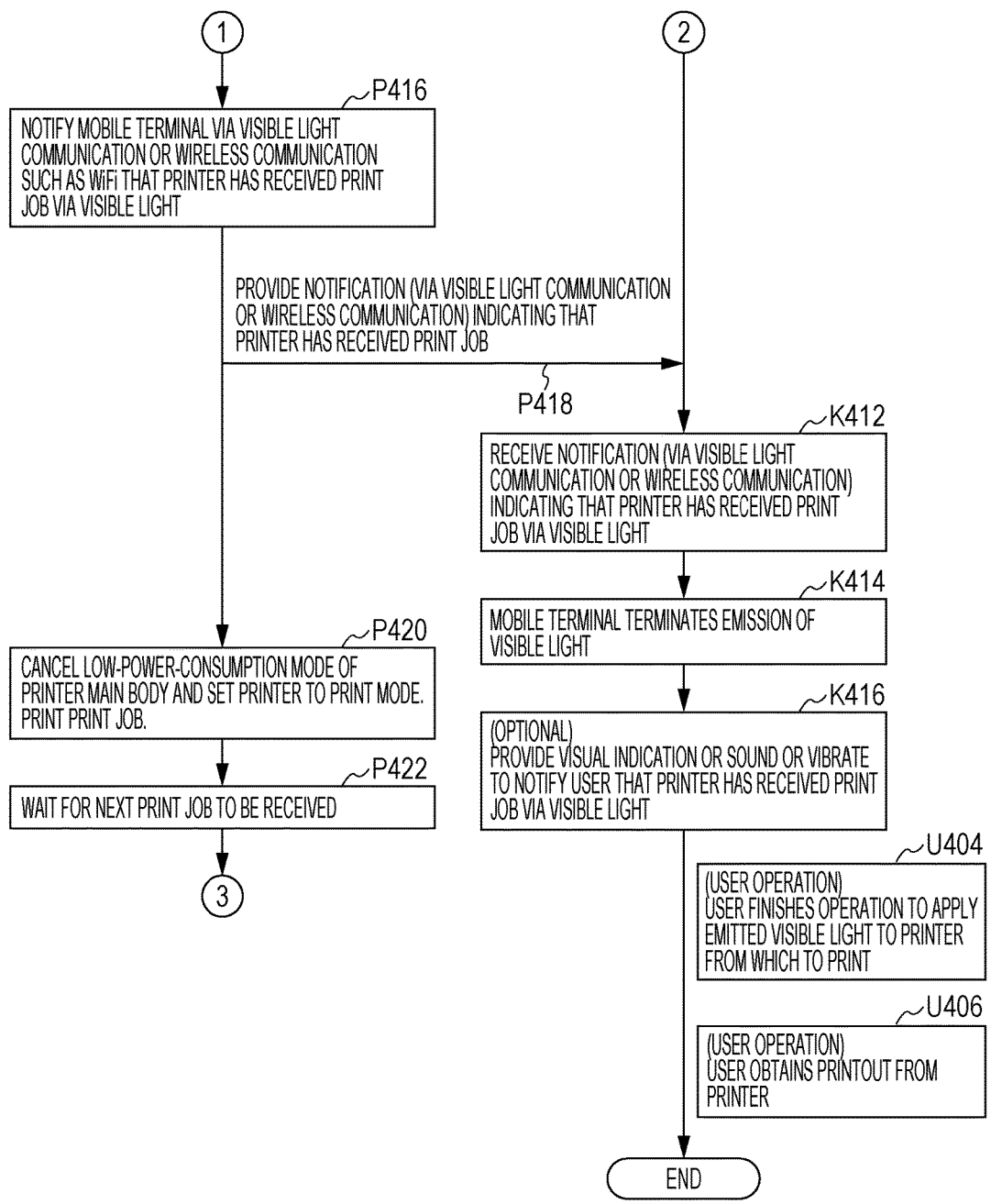

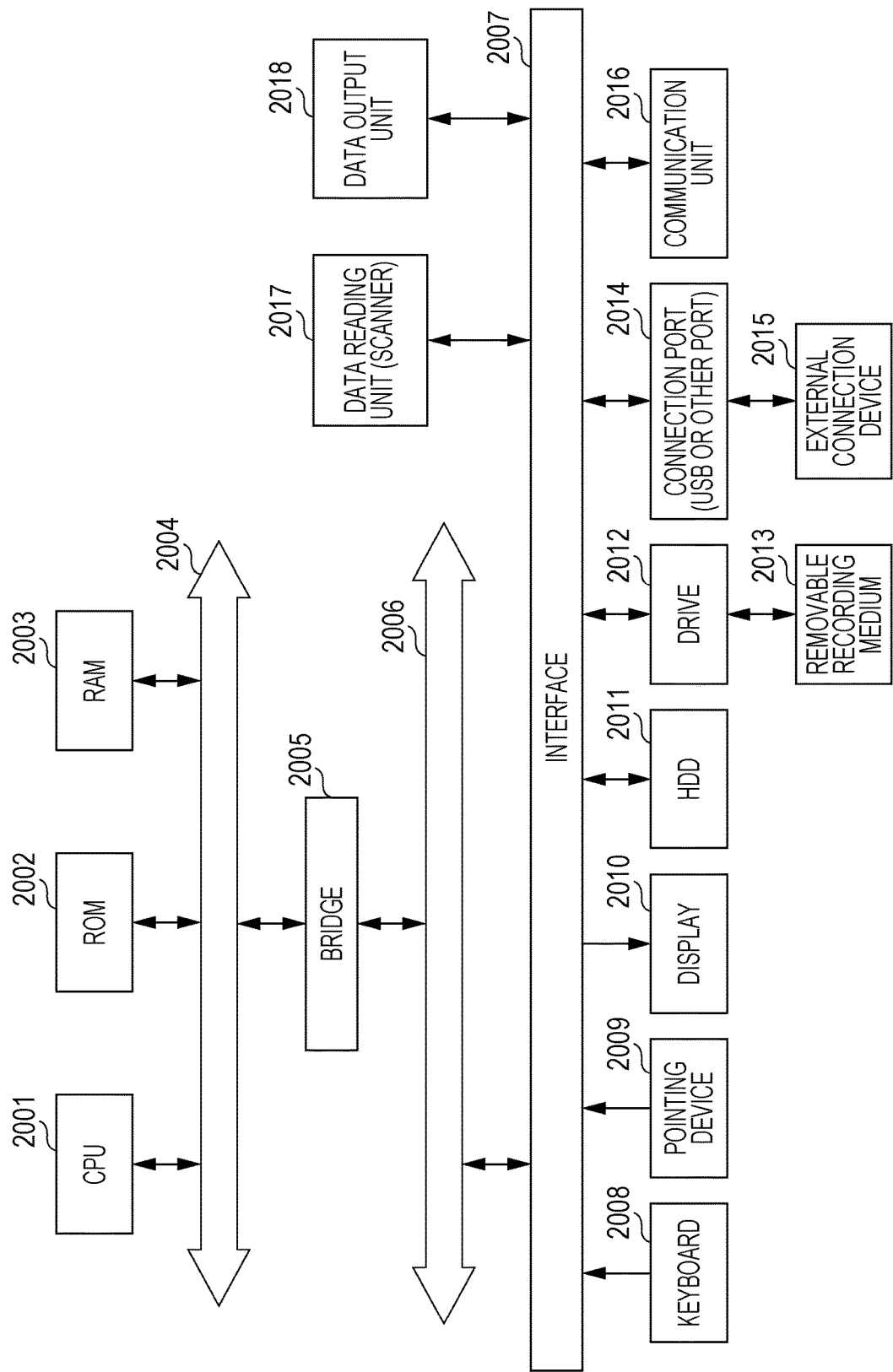

INFORMATION PROCESSING APPARATUS, PRINTER, AND NON-TRANSITORY COMPUTER READABLE MEDIUM

CROSS-REFERENCE TO RELATED APPLICATIONS

This application is based on and claims priority under 35 USC 119 from Japanese Patent Application No. 2016-230214 filed Nov. 28, 2016.

BACKGROUND (i) Technical Field

The present invention relates to an information processing apparatus, a printer, and a non-transitory computer readable medium.

(ii) Related Art

There are available information processing apparatuses for performing optical communication.

Furthermore, for example, mobile information processing apparatuses provide print instructions, and printers perform printing.

SUMMARY

According to an aspect of the invention, there is provided an information processing apparatus including a detector and a receiver. The detector detects a person. The receiver receives optical communication. The receiver does not accept reception of the optical communication when no person is detected by the detector.

BRIEF DESCRIPTION OF THE DRAWINGS

An exemplary embodiment of the present invention will be described in detail based on the following figures, wherein:

FIG. 1 is a conceptual module configuration diagram of an example configuration according to the exemplary embodiment;

FIGS. 2A and 2B1 through 2B4 illustrate an example configuration of a system according to the exemplary embodiment;

FIG. 4 is a flowchart illustrating an example process according to the exemplary embodiment;

FIG. 5 is a flowchart illustrating the example process according to the exemplary embodiment;

FIG. 20 is a block diagram illustrating an example hardware configuration of a computer that implements the exemplary embodiment.

DETAILED DESCRIPTION

Figure 3A:
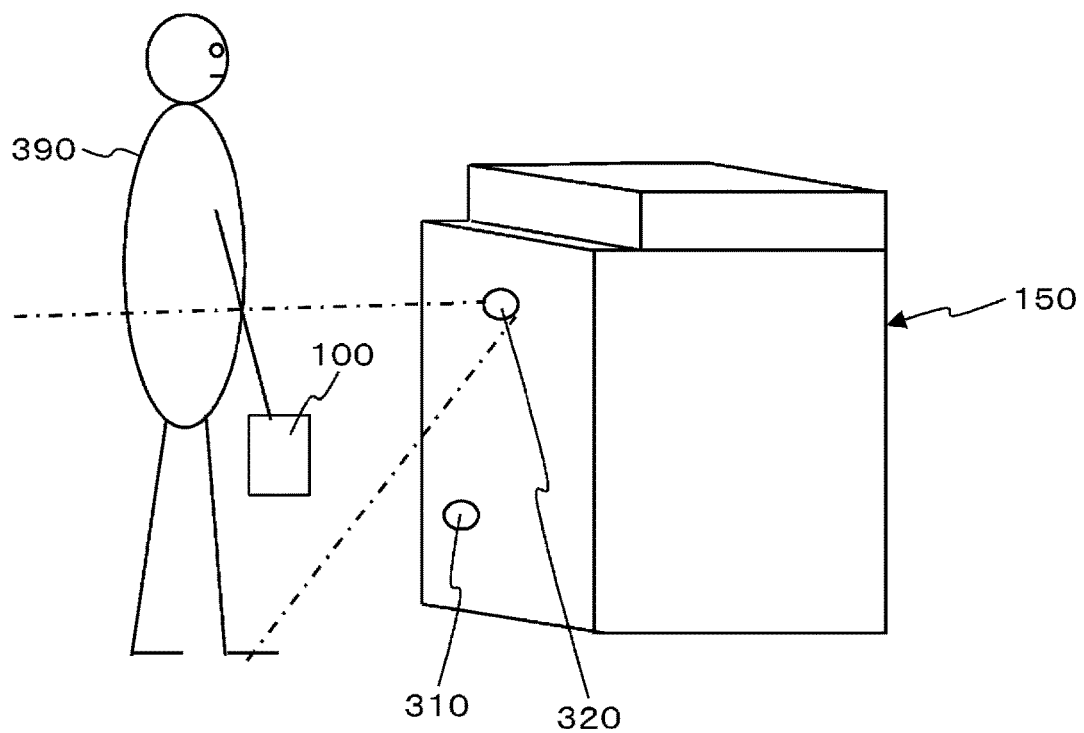
FIGS. 3A and 3B illustrate specific examples of a printer according to the exemplary embodiment.

An exemplary embodiment of the present invention will be described hereinafter with reference to the drawings.

FIG. 1 is a conceptual module configuration diagram of an example configuration according to this exemplary embodiment.

The term "module" generally refers to a logically separable component such as software (computer program) or hardware. Thus, each module in this exemplary embodiment refers not only to a module in a computer program but also to a module in a hardware configuration. Accordingly, this exemplary embodiment is also directed to a computer program for causing a computer to function as these modules (i.e., a program for causing the computer to execute the respective procedures, a program for causing the computer to function as the respective units, or a program for causing the computer to implement the respective functions), as well as to a system and a method. While the expressions "store data" and "data is stored" and their equivalent expressions are used for convenience of description, such expressions have a meaning of making a storage device store data or controlling a storage device to store data if an exemplary embodiment is directed to a computer program. While each module may be given a single function, each module may be constituted by a single program or multiple modules may be constituted by a single program in actual implementation. Conversely, a single module may be constituted by multiple programs. In addition, multiple modules may be executed by a single computer, or a single module may be executed by multiple computers in a distributed or parallel environment. As an alternative, a single module may include another module. In the following, the term "connection" refers not only to a physical connection but also to a logical connection (such as exchanging of data, sending instructions, and a reference relationship between data). The term "predetermined" refers to a state in which certain information is determined before intended processing is to be performed, and is used to include not only a state in which such information is determined at a time point prior to the commencement of processing according to this exemplary embodiment but also a state in which the information is determined at a time point prior to intended processing even after the processing according to this exemplary embodiment has commenced, depending on the condition or the state at that time or depending on the condition or the state until that time. When there are multiple "predetermined values", the values may be different or two or more (or all) of the values may be identical. A description "if A, then B"

is used to mean: "it is determined whether or not A, and B if it is determined that A" unless the determination of whether or not A is required.

Furthermore, the term "system", "apparatus", or "device" is used to include a configuration in which multiple computers, hardware components, apparatuses, devices, or other suitable elements are connected to each other via a communication medium such as a network (including one-to-one communication connections), and what is implemented by a single computer, hardware component, apparatus, device, or suitable element. The terms "apparatus", "device", and "system" are used synonymously. It is to be understood that the term "system" does not include what is merely a social "mechanism" (social system), which is a kind of artificial arrangement.

Moreover, target information is read from a storage device for each processing operation that is to be performed by an individual module or, if multiple processing operations are to be performed within a module, for each of the multiple processing operations. After the processing is performed, the result of the processing is written to the storage device. Thus, the reading of information from the storage device before the processing of the information is to be performed and the writing of information to the storage device after the processing of the information has been performed are not described in some cases. Examples of the storage device used here may include a hard disk, a random access memory (RAM), an external storage medium, a storage device connected via a communication line, and a register within a central processing unit (CPU).

A system according to this exemplary embodiment is constituted by a mobile terminal 100 and a printer 150. The mobile terminal 100 is configured to provide a print instruction (also referred to as a "print job") to the printer 150. The printer 150 is configured to perform printing upon receipt of a print instruction from the mobile terminal 100. For example, in a setting in which a user temporarily uses the printer 150 (such as when the user uses the printer 150 one time in a location during a business trip), it may be bothersome for the user to set settings for establishing communication between the mobile terminal 100 and the printer 150. In addition, saving of such settings may cause a problem in terms of security. This exemplary embodiment eliminates the need to perform a communication setting operation even in this case to send a print instruction from the mobile terminal 100 of the user to thereby perform printing using the printer 150.

While the following description relates to the printer 150, an information processing apparatus in which a print control module 175, a file storage module 180, and a printing module 185 are implemented using a module having a different function may be used. A user may use the information processing apparatus by utilizing optical communication using the mobile terminal 100. The information processing apparatus may be, for example, a piece of office equipment such as a facsimile machine or a file storage device, a home electric appliance such as an air conditioner, or a device installed outdoor such as a vending machine or an advertising device.

Optical communication (also referred to as optical wireless communication) is used for communication between the mobile terminal 100 and the printer 150 (in particular, at least communication from the mobile terminal 100 to the printer 150). Examples of optical communication include visible light communication and infrared communication. Such communication is used for short-range communication. Each of the mobile terminal 100 and the printer 150 may be provided with an optical communication device which may be implemented as either or both of an infrared communication device and a visible light communication device. In the following description, the term "light" or "light beam" may refer to either infrared radiation or visible light. It is to be understood that the combination of emission and reception of light refers to the combination of transmission and reception in infrared communication or the combination of transmission and reception in visible light communication. Whereas visible light is perceivable and allows a viewer to see the destination, infrared radiation is not perceivable by a viewer. In the case of infrared radiation, the viewer is not able to see the light beam (the beam of infrared radiation) and it is thus desirable that the mobile terminal 100 and the printer 150 face in close proximity. The expression "applying a light beam" or a similar expression is also used for infrared communication and is used to indicate, as an operation to be taken by a person, positioning the mobile terminal 100 so that an infrared communication device of the mobile terminal 100 and an infrared communication device of the printer 150 face in close proximity.

Visible light communication is a way of communication that uses visible light emitted from an illumination source such as a light emitting diode (LED) and modulated by changing the intensity of the visible light. The following are examples of standards for visible light communication.

JEITA CP-1221/1222/1223 (Japan Electronics and Information Technology Industries Association) These standards are used principally for illumination light communication with 4.8 kbps each way.

JEITA CP-1221 Visible Light Communications System, March 2007 http://www.jeita.or.jp/japanese/standard/book/CP-1221

JEITA CP-1222 Visible Light ID System, June 2007 http://www.jeita.or.jp/japanese/standard/book/CP-1222

JEITA CP-1223 Visible Light Beacon System, May 2013 http://www.jeita.or.jp/japanese/standard/book/CP-1223

The standards listed above provide various applications, such as identifying an object, providing position information, and establishing various guidance systems, by causing a visible light source to transmit via radiation brief information or identification (ID) information specific to the visible light source.

ARIB STD-T50 Ver. 4.0 (Association of Radio Industries and Businesses), December 2009

This standard is a standard for optical local area network (LAN) (visible light extension of infrared light LAN) that uses visible light for downlink and infrared light for uplink.

http://www.arib.or.jp/english/html/overview/doc/1-STD-T50v4_0.pdf

IrDA "Visible Light Communication Standard" Ver. 1.0 (the joint cooperative agreement between the Visible Light Communications Consortium (VLCC) and the Infrared Data Association (IrDA)), February 2009

This standard is a standard that is an extension to and compatible with IrDA visible light communication technology.

Institute of Electrical and Electronics Engineers (IEEE) 802.15.7 (January 2009)

This standard is a visible light communication standard that has been released.

IEEE 802.15.SG7a

This standard is a visible light communication standard that uses image sensors.

Examples of the standard for optical wireless data communication based on infrared radiation include IrDA DATA.

For instance, an infrared communication unit includes a light-emitting diode for transmitting infrared radiation and a photodiode for receiving infrared radiation, and is configured to transmit and receive data via infrared radiation in accordance with a predetermined protocol (e.g., Object Exchange Protocol (OBEX), etc.). The printer 150 receives print data including content to be printed from the mobile terminal 100 via infrared communication and forms on a print medium an image corresponding to the print data. Any infrared communication scheme such as IrDA, Fast IrDA, Ir-Simple, or Ultra Fast IR may be used.

It is to be understood that optical communication based on unstandardized, uniquely designed specifications may be used.

The mobile terminal 100 emits light for optical communication (emits light for visible light communication or emits infrared radiation for infrared communication) and transmits a print instruction to the printer 150 by applying a light beam to the printer 150. The printer 150 receives the light beam from the mobile terminal 100 and receives the print instruction.

When a print instruction is to be transmitted from the mobile terminal 100 to the printer 150 via visible light communication, no operation input is made on the mobile terminal 100 to select a destination of the print instruction.

Communication settings information (e.g., information on the settings necessary for wireless communication such as WiFi) on the mobile terminal 100 may not be transmitted to the printer 150. Further, the communication settings information on the mobile terminal 100 may not be set in the printer 150 not only when the communication settings information is not transmitted from the mobile terminal 100 but also even when the communication settings information is transmitted from the mobile terminal 100. Conversely, communication settings information on the printer 150 may not be transmitted to the mobile terminal 100. Further, the communication settings information on the printer 150 may not be set in the mobile terminal 100 not only when the communication settings information is not transmitted from the printer 150 but also even when the communication settings information is transmitted from the printer 150.

As in the example illustrated in FIG. 1, the mobile terminal 100 includes an optical wireless transmitting module 105, a receiving module 110, a communication control module 115, a user interface module 120, and a file storage module 125. The mobile terminal 100 is typically also called a portable terminal, examples of which include mobile phones (including smartphones), notebook personal computers (PCs), and wearable terminals (e.g., wristwatch-type terminals, glasses-type terminals etc.). The mobile terminal 100 is capable of optical communication (at least optical communication for transmission) and is designed to transmit a print instruction to the printer 150 in accordance with a user operation.

The optical wireless transmitting module 105 is connected to the communication control module 115. The optical wireless transmitting module 105 emits light for optical communication to the printer 150. The optical wireless transmitting module 105 is controlled by the communication control module 115 to transmit a print instruction to the printer 150 via optical communication.

The optical wireless transmitting module 105 may transmit a print instruction to the printer 150 without accepting a user operation for selecting the printer 150, which is the destination of the print instruction. This eliminates the need for the user to select the address, name, or the like of the printer 150 at the other end of the communication, which is necessary for typical wireless communication. The mobile terminal 100 may not necessarily store communication settings information (e.g., the address, name, or the like of the printer 150) necessary for communication with the printer 150.

The optical wireless transmitting module 105 may be disposed so as to be oriented in the same or substantially the same direction as that of a camera included in the mobile terminal 100. In this case, an image captured with the camera may be displayed on a display of the user interface module 120 to allow the user to view the destination of optical communication (i.e., the printer 150).

The receiving module 110 is connected to the communication control module 115. The receiving module 110 receives information from the printer 150. The receiving module 110 may be a receiving device used for optical communication or may be any other communication device. The receiving module 110 may support, for example, WiFi or Bluetooth (registered trademark), which is a standard for short-range wireless communication.

The communication control module 115 is connected to the optical wireless transmitting module 105, the receiving module 110, the user interface module 120, and the file storage module 125. The communication control module 115 transmits a print instruction to the printer 150 via the optical wireless transmitting module 105 by using optical communication. Visible light communication makes the source (e.g., a light-emitting unit of the mobile terminal 100), the destination (e.g., a light-receiving unit of the printer 150), and a communication path visible to the user and hence allows the user to readily understand the communication range.

The communication control module 115 may transmit a print instruction multiple times. The reason for this is as follows. In some cases, reception via optical communication may commence before the printer 150 receives the header portion of a print instruction. That is, the mobile terminal 100 may start optical communication before applying a light beam to a light-receiving sensor of the printer 150.

When the mobile terminal 100 transmits a print instruction multiple times, a communication control module 165 of the printer 150 determines whether or not the currently received print instruction is identical to the previously received print instruction, and may discard the currently received print instruction if both print instructions are identical.

The user interface module 120 is connected to the communication control module 115 and the file storage module 125. The user interface module 120 accepts a user operation made via a touch screen, audio, a line of sight, a gesture, a mouse, a keyboard, or the like. Examples of the user operation include sending a print instruction. The user interface module 120 informs the user of information by using a liquid crystal display, a speaker, a vibrator, or any other suitable device. The user interface module 120 may provide an indication if information indicating receipt of a print instruction has been received from the printer 150. In response to the indication, the user performs an operation of interrupting optical communication (such as turning off light for optical communication or preventing light for optical communication from being applied to a light-receiving sensor of the printer 150). When a print instruction is to be transmitted to the printer 150 via optical communication, the user interface module 120 may suggest that the user perform an operation to apply light to the light-receiving unit of the printer 150. This suggestion allows the user to readily understand the operation to be performed to transmit a print instruction to the printer 150 via optical communication.

The file storage module 125 is connected to the communication control module 115 and the user interface module 120. The file storage module 125 stores a file to be printed. The communication control module 115 may create a print instruction that includes a file to be printed.

As in the example illustrated in FIG. 1, the printer 150 includes an optical wireless receiving module 155, a transmitting module 160, a communication control module 165, a user interface module 170, the print control module 175, the file storage module 180, the printing module 185, and a person detection module 190. The printer 150 may be typically a printing apparatus or a multifunction device having a printing function (an image processing device having two or more of the functions of a scanner, a printer, a copying machine, a facsimile machine, and other devices).

The person detection module 190 is connected to the optical wireless receiving module 155. The person detection module 190 detects a person (who may be an operator or a user of the printer 150). The person detection module 190 corresponds to, for example, a human sensor 310 or a human/optical wireless receiver sensor 330 described below with reference to FIGS. 3A and 3B.

The optical wireless receiving module 155 is connected to the communication control module 165 and the person detection module 190. The optical wireless receiving module 155 receives optical communication from the mobile terminal 100. It is to be understood that the optical communication may include a print instruction. The optical wireless receiving module 155 corresponds to, for example, an optical wireless receiver sensor 320 or the human/optical wireless receiver sensor 330 described below with reference to FIGS. 3A and 3B.

If no person is detected by the person detection module 190, the optical wireless receiving module 155 does not accept reception via optical communication (optical communication may include a print instruction). In response to the person detection module 190 detecting a person, the optical wireless receiving module 155 enables acceptance of reception via optical communication (optical communication may include a print instruction). The expression "the optical wireless receiving module 155 does not accept reception via optical communication" means, specifically, that the optical wireless receiving module 155 is not activated or that the function of the optical wireless receiving module 155 for receiving optical communication is disabled. Thus, the power consumption of the optical wireless receiving module 155 may be reduced.

The person detection module 190 may be used to receive optical communication. That is, the person detection module 190 may also be used as the optical wireless receiving module 155. It is to be understood that the optical wireless receiving module 155 may also be used as the person detection module 190. In this case, for example, the person detection module 190 or the optical wireless receiving module 155 corresponds to the human/optical wireless receiver sensor 330 described below with reference to FIG. 3.

The person detection module 190 and the optical wireless receiving module 155 perform the following process.

If no person is detected (if the presence or approach of a person is not detected), the optical wireless receiving module 155 (optical communication receiver) is deactivated so that reception of optical communication is not accepted.

Upon detection of a person, the optical wireless receiving module 155 (optical communication receiver) is activated to accept reception of optical communication. Thereafter, the printer 150 performs printing in accordance with the received print instruction.

After the detection of a person, when a retreat of the person is detected, the optical wireless receiving module 155 (optical communication receiver) is deactivated so that reception of optical communication is not accepted.

In general, visible light in visible light communication is propagated a long distance. However, a user who is to transmit a print instruction from the mobile terminal 100 to the printer 150 by using visible light communication is less likely to transmit visible light including the print instruction to the light-receiving unit of the printer 150 from a position far from the printer 150, but is more likely to transmit visible light including the print instruction to the light-receiving unit of the printer 150 from a position close to the printer 150. Accordingly, the optical wireless receiving module 155 (visible light communication receiver) is deactivated when the user is not near the printer 150 (that is, if no person is detected by the person detection module 190), and the optical wireless receiving module 155 (visible light communication receiver) is activated only when the user is near the printer 150. This may save power. A print instruction may be transmitted by using infrared communication instead of visible light communication, which may offer similar advantages.

The transmitting module 160 is connected to the communication control module 165. The transmitting module 160 transmits information to the mobile terminal 100. The transmitting module 160 may be a transmitting device used for optical communication or may be any other communication device. For example, the transmitting module 160 may support WiFi, Bluetooth, or the like. The transmitting module 160 may transmit information indicating receipt of a print instruction to the mobile terminal 100 by using wireless communication different from optical communication. The "wireless communication different from optical communication" may be, as described above, communication based on WiFi, Bluetooth, or the like. If optical communication used for the transmission of a print instruction is infrared communication, the "wireless communication different from optical communication" may include visible light communication. If optical communication used for the transmission of a print instruction is visible light communication, the "wireless communication different from optical communication" may include infrared communication.

The communication control module 165 is connected to the optical wireless receiving module 155, the transmitting module 160, the user interface module 170, the print control module 175, and the file storage module 180. The communication control module 165 receives a print instruction from the mobile terminal 100 via the optical wireless receiving module 155 over optical communication.

Further, the communication control module 165 may be configured not to set the communication settings information on the mobile terminal 100 that has transmitted the print instruction via optical communication. It is a matter of course that the communication settings information on the mobile terminal 100 is not set if the communication settings information on the mobile terminal 100 has not been transmitted. Even if the communication settings information on the mobile terminal 100 has been transmitted, the communication settings information on the mobile terminal 100 is not set. This is because information on the mobile terminal 100 is not left in the printer 150.

If the mobile terminal 100 transmits communication settings information thereon in order to perform wireless communication other than optical communication, the current communication of a print instruction is performed by using the communication settings information via wireless communication other than optical communication. After the completion of the current communication of the print instruction, the communication settings information is deleted from the printer 150.

The communication control module 165 may be configured not to transmit to the mobile terminal 100 information (e.g., a reception completion notification, etc.) indicating that the optical wireless receiving module 155 has received a print instruction from the mobile terminal 100. In this case, one-way (one-sided) communication from the mobile terminal 100 to the printer 150 may be performed. It is to be understood that the communication control module 165 may transmit to the mobile terminal 100 information indicating that the optical wireless receiving module 155 has received a print instruction from the mobile terminal 100.

The user interface module 170 is connected to the communication control module 165 and the print control module 175. The user interface module 170 accepts a user operation made via a touch screen, audio, a line of sight, a gesture, a mouse, a keyboard, or the like. Further, the user interface module 170 informs the user of information by using a liquid crystal display, a speaker, a vibrator, or any other suitable device. For example, when a print instruction is to be received via optical communication, the user interface module 170 provides a suggestion about an operation to be performed by the user. Specifically, when a print instruction is to be received from the mobile terminal 100 via visible light communication, the user interface module 170 may suggest that the user perform an operation to apply visible light to the light-receiving unit of the printer 150. This suggestion allows the user to readily understand the operation to be performed to transmit a print instruction to the printer 150 via visible light communication. For example, when a print instruction is to be received from the mobile terminal 100 via infrared communication, the user interface module 170 may suggest that the user perform an operation of positioning the mobile terminal 100 so that an infrared communication unit of the mobile terminal 100 and an infrared communication unit of the printer 150 face in close proximity. This suggestion allows the user to readily understand the operation to be performed to transmit a print instruction to the printer 150 via infrared communication.

The print control module 175 is connected to the communication control module 165, the user interface module 170, the file storage module 180, and the printing module 185. The print control module 175 causes the printing module 185 to perform a printing process in accordance with the print instruction received by the communication control module 165.

The file storage module 180 is connected to the communication control module 165 and the print control module 175. The file storage module 180 stores a file (a document to be printed) included in the print instruction received by the communication control module 165.

The printing module 185 is connected to the print control module 175. The printing module 185 performs a printing process based on the received print instruction in accordance with control of the print control module 175.

After the printing module 185 has completed printing, the print control module 175 may delete the file intended to be printed from the file storage module 180.

FIGS. 2A and 2B1 through 2B4 illustrate an example configuration of a system that utilizes this exemplary embodiment, for example.

As in the example illustrated in FIG. 2A, the printer 150 receives optical communication 210 from the mobile terminal 100 and receives a print instruction. Then, the printer 150 prints a file transmitted from the mobile terminal 100. The user removes a printed sheet from the printer 150.

The printer 150 is provided with an optical communication receiving device in an area thereof to which light (visible light or infrared radiation) can be applied from the outside (e.g., from the mobile terminal 100). Examples of the area include a front surface portion and a top surface portion of the printer 150.

In the example illustrated in FIG. 2A, the mobile terminal 100 and the printer 150 are away from each other. The mobile terminal 100 and the printer 150 may be in close proximity to each other if optical communication is possible therebetween. For example, as illustrated in FIG. 2B1, a mobile terminal seat 220 for accommodating the mobile terminal 100 may be disposed in a top surface portion of the printer 150.

For example, as illustrated in FIG. 2B2, an optical communication receiving device 225 may be disposed on an upper side surface of the mobile terminal seat 220. Alternatively, an optical communication receiving device 230 may be disposed on a bottom surface of the mobile terminal seat 220. The optical communication receiving device 225 may be defined over the entirety of the upper side surface of the mobile terminal seat 220. The optical communication receiving device 230 may be defined over the entirety of the bottom surface of the mobile terminal seat 220. The optical communication receiving device 225 (the optical communication receiving device 230) may be defined on the upper side surface, the right side surface, the left side surface, the lower side surface, or the bottom surface or may be defined over the entirety thereof. The optical communication receiving device 225 (the optical communication receiving device 230) may be defined so as to match the position of an optical communication transmitting device of the mobile terminal 100.

Alternatively, the optical communication receiving device 225 (the optical communication receiving device 230) may be defined on the entirety (the upper side surface, the lower side surface, the right side surface, the left side surface, and the bottom surface) of the mobile terminal seat 220 in order to support the mobile terminal 100 regardless of how the mobile terminal 100 is placed or what type the mobile terminal 100 is.

As in the example illustrated in FIG. 2B3, the mobile terminal 100 may include an optical communication transmitting device 250 on a side surface of the mobile terminal 100. Alternatively, as in the example illustrated in FIG. 2B4, the mobile terminal 100 may include an optical communication transmitting device 255 near a camera 260. In this case, as described above, an image of an entity at the recipient of the optical communication (i.e., a receiving unit of the printer 150) is captured with the camera 260 and is displayed on a display of the mobile terminal 100, thereby allowing the user to check the entity at the other end of the communication. A device attached to the mobile terminal 100, such as an imaging light, for example, a strobe, or a display, may be used as a light-emitting device for use in visible light communication.

Figure 3B:
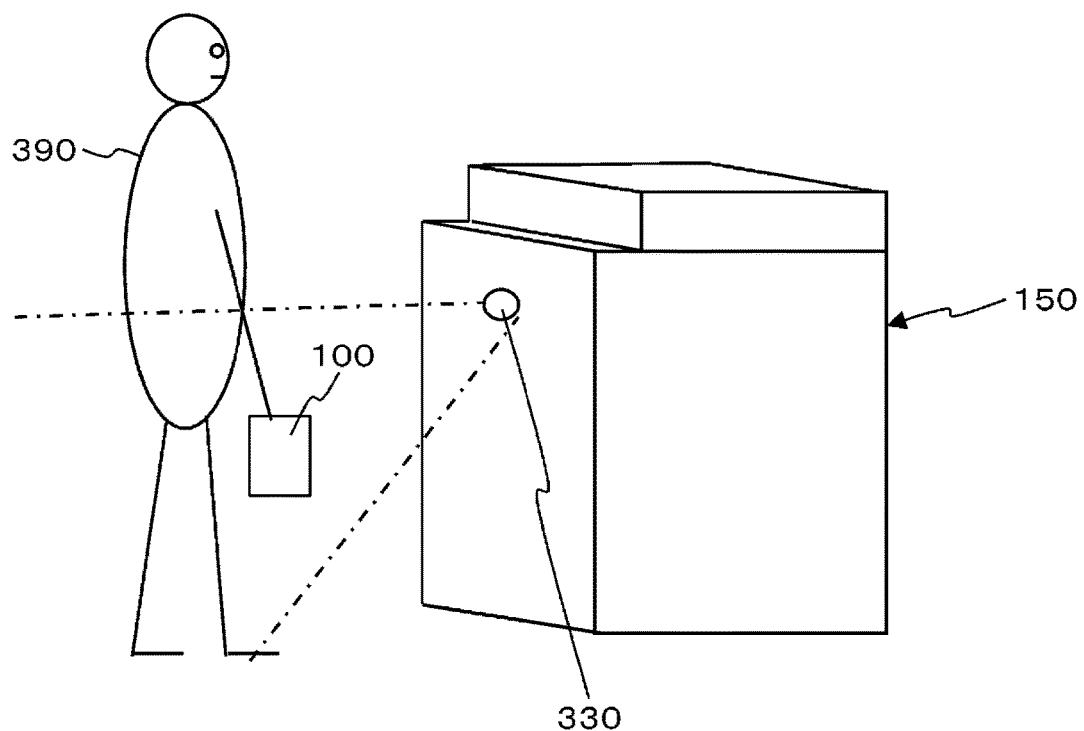

FIGS. 3A and 3B illustrate specific examples of the printer 150.

In the example illustrated in FIG. 3A, the printer 150 includes a human sensor 310 and an optical wireless receiver sensor 320. The human sensor 310, which is an example of the person detection module 190 illustrated in FIG. 1, and the optical wireless receiver sensor 320, which is an example of the optical wireless receiving module 155, are separate from each other. The broken lines define the communication range of the optical wireless receiver sensor 320. The human sensor 310 may be positioned near an operation unit of the printer 150, for example.

The human sensor 310 may be either a "thermal detection" infrared array sensor or a "distance detection" sensor or may be a sensor that employs both of the schemes, for example. An infrared array sensor of the "thermal detection" type detects a change in the heat generated from a person. A sensor of the "distance detection" type detects the distance to a person. The human sensor 310 determines whether or not a person is moving and predicts whether or not the person is a user. When a user approaches the printer 150, the optical wireless receiver sensor 320 is activated. It is to be understood that the optical wireless receiver sensor 320 does not accept reception as long as the human sensor 310 does not detect a person. That is, the optical wireless receiver sensor 320 is not constantly activated, and thus the power consumption of the optical wireless receiver sensor 320 may be kept low.

In the example illustrated in FIG. 3B, the printer 150 includes a human/optical wireless receiver sensor 330. The human/optical wireless receiver sensor 330 has both the functions of the person detection module 190 and the optical wireless receiving module 155 in the example illustrated in FIG. 1. The broken lines define the communication range (detection range) of the human/optical wireless receiver sensor 330. As in the example illustrated in FIG. 3A, the human/optical wireless receiver sensor 330 determines whether or not a person is moving and predicts whether or not the person is a user. When a user approaches the printer 150, the function of the optical wireless receiving module 155 is started.

Here, a human sensor in the human/optical wireless receiver sensor 330 is configured to capture images of a person with an infrared sensor array (camera) or a visible light sensor array (camera) to detect an approach of a person within a predetermined area. The function of receiving optical communication (visible light communication or infrared communication) is simply added to the printer 150 including a human sensor, which results in a configuration in which, as in the example illustrated in FIG. 3A, a human sensor (the human sensor 310) that utilizes visible light and a visible light communication receiving unit (the optical wireless receiver sensor 320) are separately provided or a human sensor (the human sensor 310) that utilizes infrared radiation and an infrared communication receiving unit (the optical wireless receiver sensor 320) are separately provided. Having such separate devices is wasteful, and the resulting configuration is more costly and has higher power consumption than that in the example illustrated in FIG. 3B. The human/optical wireless receiver sensor 330 has the functions of the person detection module 190 and the optical wireless receiving module 155. Specifically, an infrared sensor array or a visible light sensor array is used to detect an approach of a person and to perform optical communication (infrared communication or visible light communication, in particular, reception of such communication).

FIGS. 4 and 5 are a flowchart illustrating an example process according to this exemplary embodiment. An example in which visible light communication is used as optical communication is illustrated. The following description will be made in the context of the example illustrated in FIG. 3A. When the example illustrated in FIG. 3B is used, the human sensor 310 may be read as the human sensor function of the human/optical wireless receiver sensor 330 and the optical wireless receiver sensor 320 may be read as the optical communication function of the human/optical wireless receiver sensor 330.

The printer 150 performs the following process.

In step P402, the printer 150 is in the low-power-consumption mode. The human sensor 310 is in operation. The optical wireless receiver sensor 320 is not in operation. The human sensor 310 is capable of detecting the presence or approach of a person. In the example illustrated in FIG. 3A, the human sensor 310 utilizes infrared radiation, visible light, ultrasonic waves, or the like. In the example illustrated in FIG. 3B, the human sensor 310 utilizes a light beam that is identical to that for use in optical communication (in the illustrated example, visible light).

In step P404, the printer 150 determines whether or not the human sensor 310 has detected an approach of a person. If an approach of a person has been detected, the process proceeds to step P406, or otherwise, the printer 150 waits until an approach of a person has been detected. That is, if no person is detected by the human sensor 310, the optical wireless receiver sensor 320 remains not in operation and thus the optical wireless receiver sensor 320 does not accept receipt of a print job. In response to the human sensor 310 detecting a person entering a particular area or detecting a person approaching the printer 150 in a particular area, the printer 150 determines that a person has been detected. The particular area refers to a predetermined area or an area within a predetermined distance.

In step P406, the low-power-consumption mode of the printer 150 remains enabled. The optical wireless receiver sensor 320 is activated. That is, if the human sensor 310 has detected a person in step P404, the optical wireless receiver sensor 320 enables acceptance of receipt of a print job.

The process proceeds to step SP408 upon execution of step K410.

In step P408, the printer 150 receives optical communication including a print job by using the optical wireless receiver sensor 320.

In step P410, the optical wireless receiver sensor 320 receives visible light based on the visible light communication standard, and the printer 150 determines whether or not the received visible light includes a print job. If a print job is included, the process proceeds to step P416, or otherwise, the process proceeds to step P412.

In step P412, the printer 150 determines whether or not the human sensor 310 has detected a retreat of the person. If a retreat of the person has been detected, the process proceeds to step P414, or otherwise, the process returns to step P408. If entry of the person into the particular area has not been detected, the printer 150 determines a retreat of the person.

A distance A for detecting an approach of a person and a distance B for detecting a retreat of the person may be the same or different. It is desirable that the distance B, which serves as a threshold, be longer than the distance A. This ensures that reception of visible light communication and transmission of a print job are performed even in a case where, for example, after the printer 150 has emitted visible light in response to a user approaching the printer 150, the user receives visible light or transmits a print job at a different position (e.g., at a position that is a step back or at a position just in front of a visible light emitting unit or visible light receiving unit of the printer 150), particularly in a case where the user has moved to a position that is further away from the printer 150.

After the detection of a presence of a person, the distance for detecting a presence of a person may be changed. For example, a distance D after detection may be longer than a distance C before detection. This ensures that a print instruction is provided even when another person who has learned that a print instruction can be sent via visible light communication sends a print instruction at a distant position. The distance D may be used within a predetermined period after a print instruction was provided for the first time and thereafter the distance C may be used again. If another print instruction is provided during this period, the period may be initialized. That is, if multiple print instructions have been provided during this period, the distance D may be used within a predetermined period after the last print instruction has been provided, and thereafter the distance C may be used again.

In the foregoing description, distances (the distance A, the distance B, the distance C, and the distance D) are used as thresholds. Alternatively, the sensitivity of the human sensor 310 may be used as a threshold. For example, the sensitivity of the human sensor 310 may be set so that a presence of a distant person is detectable, or the sensitivity of the human sensor 310 may be set so that only a nearby person is detectable.

In step P414, the low-power-consumption mode of the printer 150 remains enabled. The optical wireless receiver sensor 320 is deactivated. Thereafter, the process returns to step P402.

In step P416, the printer 150 notifies the mobile terminal 100 of receipt of the print job via visible light. This notification may be provided via visible light communication or via wireless communication such as WiFi.

In step P418, the printer 150 provides a notification (via visible light communication or wireless communication) indicating that a print job has been received via visible light to the mobile terminal 100.

In step P420, the printer 150 cancels the low-power-consumption mode of the main body thereof and enters the print mode. The printer 150 performs printing in accordance with the print job.

In step P422, the printer 150 waits for the next print job to be received, and then the process returns to step P408. Instead of step P408, the process may be returned to step P402, step P404, or step P406.

On the other hand, the mobile terminal 100 performs the following operation. The operation of the user will also be described which is represented by step U.

In step K402, an image file icon is selected by the user. The operation of selecting the printer 150 is not input. The mobile terminal 100 may not have registered therein the address of the printer 150. When this exemplary embodiment is not used (or when the related art technique is used), the mobile terminal 100 has registered therein the address of the printer 150. Thus, a large number of printer names (printer names) are displayed in a list of selection options, which may inconvenience the user who is to select the printer 150. In this exemplary embodiment, printing is enabled without registration of the address of the printer 150 to the mobile terminal 100. It is to be understood that the user will not have to select the printer 150 on the display of the mobile terminal 100.

In step K404, a visible light communication start icon is clicked on. This operation is performed to make an instruction to transmit the image file selected in step K402.

In step K406, the mobile terminal 100 emits light based on the visible light communication standard.

In step K408, the mobile terminal 100 shows the message "Please direct the mobile terminal and apply visible light to the light-receiving unit of the printer from which to print".

In step U402, the user approaches the printer 150 from which to print. The user directs the mobile terminal 100 and applies visible light emitted from the mobile terminal 100 to the light-receiving unit of the printer 150 to perform visible light communication.

In step K410, the mobile terminal 100 transmits a print job to the printer 150 via visible light based on the visible light communication standard.

In this case, the address of the mobile terminal 100 may not necessarily be sent to the printer 150 via WiFi communication. In wireless communication such as WiFi, which requires the mobile terminal 100 and the printer 150 to set up a connection, the address of the mobile terminal 100 is sent to the printer 150 and the printer 150 temporarily stores the address. The address of the mobile terminal 100 is known by the printer 150, which may be a security concern. Since the address of the mobile terminal 100 is not sent to the printer 150, there may be no concern about security.

The process proceeds to step K412 upon execution of step P418.

In step K412, the mobile terminal 100 receives a notification (via visible light communication or wireless communication) indicating that the printer 150 has received the print job via visible light.

The notification indicating that the printer 150 has received the print job via visible light may not be transmitted via wireless communication. That is, the operations of steps P416 and P418 may not be performed. As a result, the operation of step K412 is also no longer necessary. In this case, the user knows that the print job has been successfully transmitted, by viewing an indication on a user interface of the printer 150. Then, the user performs an operation of finishing emission of visible light from the mobile terminal 100. In order to perform communication from the printer 150 to the mobile terminal 100 via wireless communication other than visible light communication, the printer 150 needs to be informed of the address of the mobile terminal 100. Omission of the operations of steps P416 and P418 eliminates such a need, and operation is made simple. In addition, there may be no concern about security.

In step K414, the mobile terminal 100 terminates emission of visible light. That is, visible light communication is terminated.

In step K416, the mobile terminal 100 performs a process (such as providing a visual indication or sound or vibrating) to notify the user that the printer 150 has received the print job via visible light. The operation of step K416 may be optional.

Thereafter, the following user operations are performed.

In step U404, the user finishes the operation to apply emitted visible light to the light-receiving unit of the printer 150 from which to print.

In step U406, the user obtains a printout from the printer 150.

FIGS. 6 to 11 illustrate example screens on the display of the mobile terminal 100 or the printer 150 when visible light communication is utilized.

Figure 6:
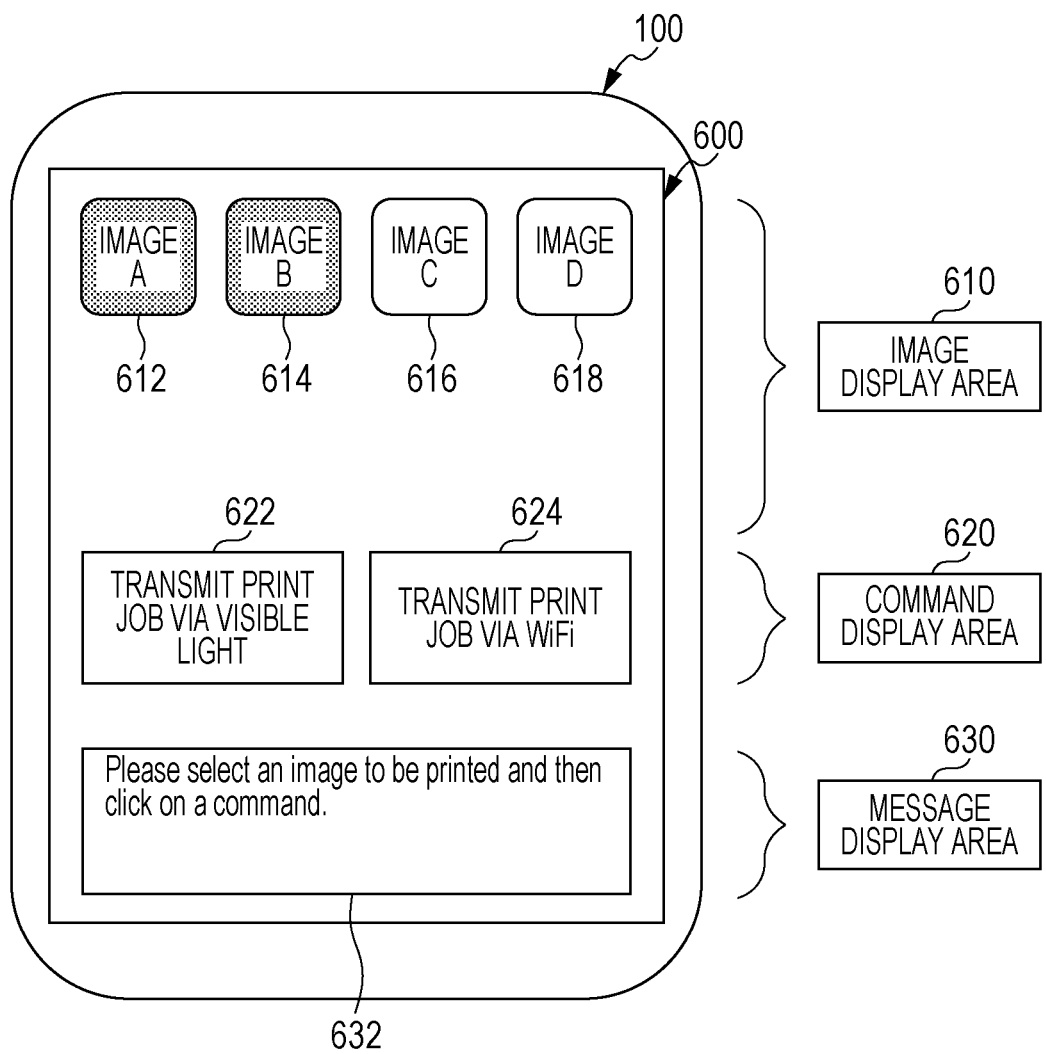
FIG. 6 illustrates an example process according to the exemplary embodiment.

FIG. 6 illustrates an example process (performed by the mobile terminal 100) according to this exemplary embodiment. Specifically, an example display in steps K402 and K404 in the flowchart is illustrated.

The mobile terminal 100 includes a display 600. The content displayed on the display 600 is illustrated.

The display 600 has three areas, namely, an image display area 610, a command display area 620, and a message display area 630.

The image display area 610 shows an "image A" icon 612, an "image B" icon 614, an "image C" icon 616, and an "image D" icon 618.

The command display area 620 shows a "Transmit print job via visible light" icon 622 and a "Transmit print job via WiFi" icon 624.

The message display area 630 contains a message display portion 632. The message display portion 632 shows, for example, the message "Please select an image to be printed and then click on a command".

The example in FIG. 6 demonstrates that the "image A" icon 612 and the "image B" icon 614 have been selected. Thereafter, when the "Transmit print job via visible light" icon 622 is clicked on, the process transitions to step K406 in the flowchart.

Figure 7:
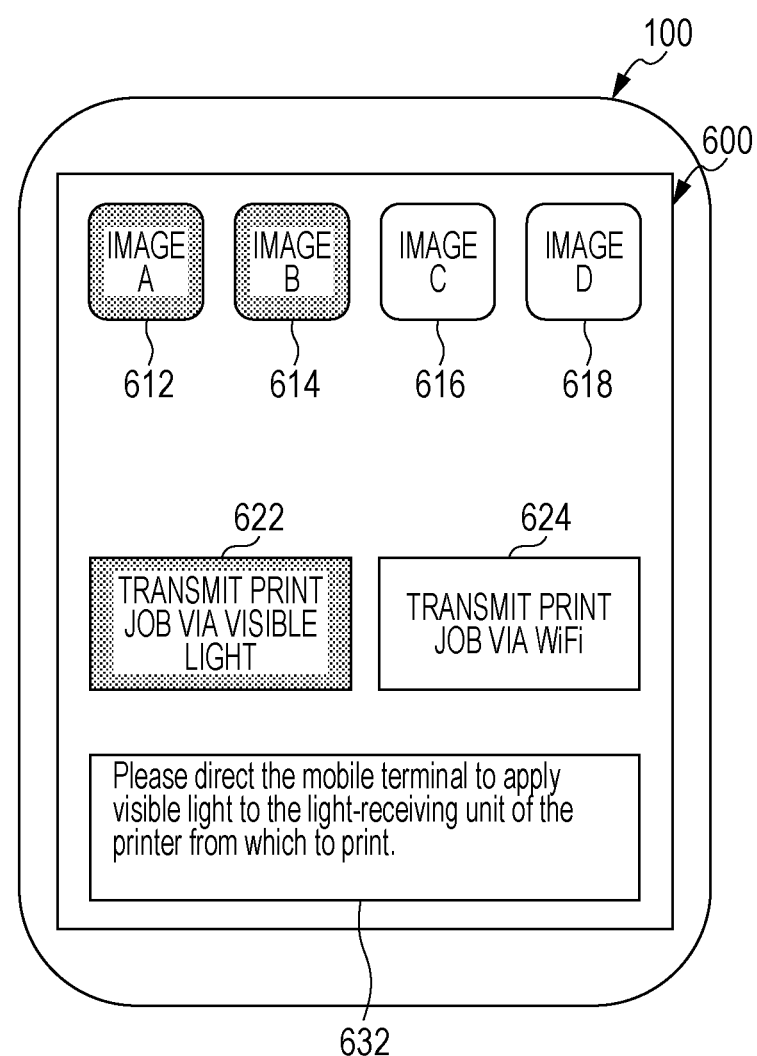
FIG. 7 illustrates an example process according to the exemplary embodiment.

FIG. 7 illustrates an example process (performed by the mobile terminal 100) according to this exemplary embodiment. Specifically, an example display in steps K406, K408, K410, and U402 in the flowchart is illustrated.

The "Transmit print job via visible light" icon 622 is being selected by user selection.

Upon acceptance of selection of the "Transmit print job via visible light" icon 622, the mobile terminal 100 emits light based on the visible light communication standard (step K406). Then, a suggestion about the operation to be performed by the user to apply visible light to the printer 150 is displayed in the message display portion 632. The message display portion 632 shows, for example, the message "Please direct the mobile terminal and apply visible light to the light-receiving unit of the printer from which to print". The display of this message allows the user to readily understand the operation to be performed.

Figure 8:
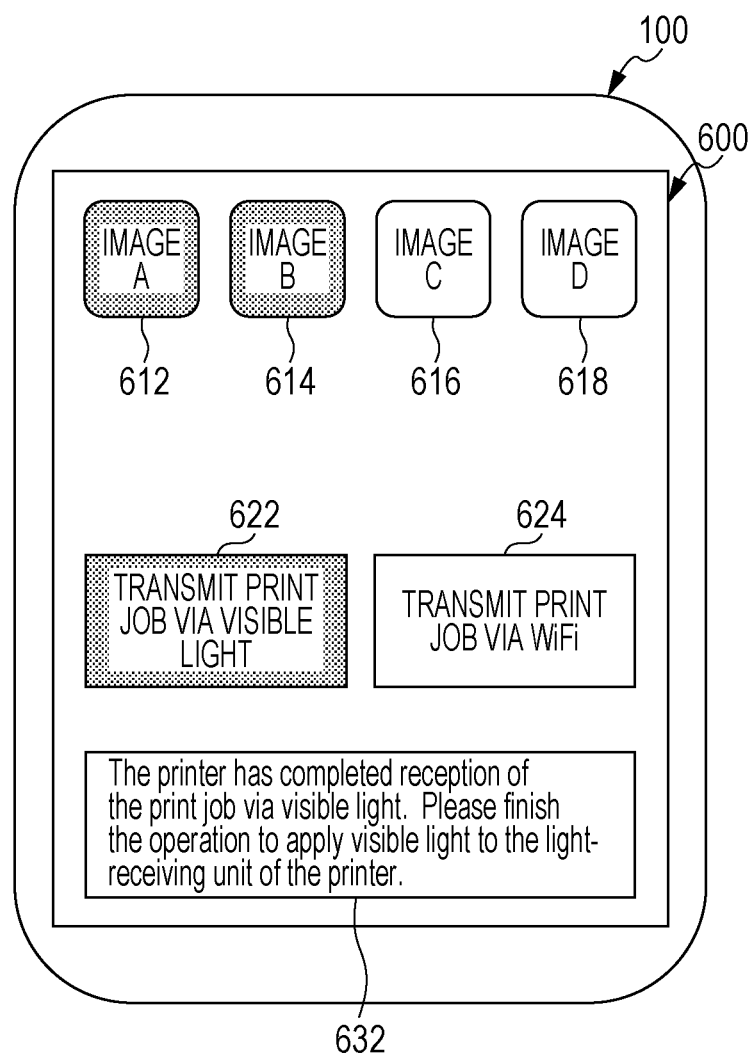
FIG. 8 illustrates an example process according to the exemplary embodiment.

FIG. 8 illustrates an example process (performed by the mobile terminal 100) according to this exemplary embodiment. Specifically, an example display in steps K412 to K416 and U404 in the flowchart is illustrated.

The "Transmit print job via visible light" icon 622 is being selected by user selection.

Emission of light from the mobile terminal 100 is terminated (step K414). Then, a suggestion about the operation to be performed by the user to finish applying visible light to the light-receiving unit of the printer 150 is displayed in the message display portion 632. The message display portion 632 shows, for example, the message "The printer has completed reception of the print job via visible light. Please finish the operation to apply visible light to the light-receiving unit of the printer". The display of this message allows the user to readily understand the operation to be performed.

Figure 9:
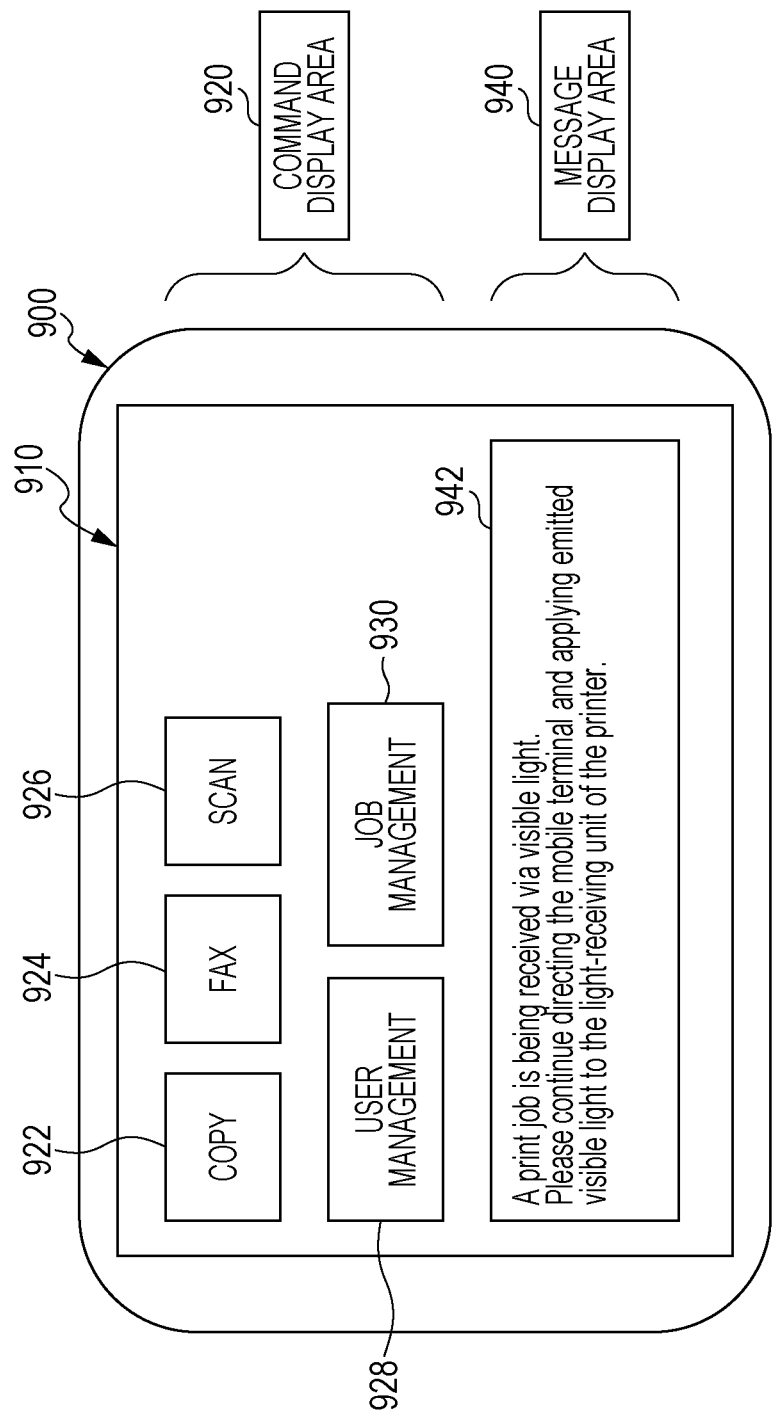
FIG. 9 illustrates an example process according to the exemplary embodiment.

FIG. 9 illustrates an example process (performed by the printer 150) according to this exemplary embodiment. Specifically, an example display in steps P408 and P410 in the flowchart is illustrated.

A display device 900 includes a display 910.

The display 910 has a command display area 920 and a message display area 940.

The command display area 920 shows a "copy" icon 922, a "fax" icon 924, a "scan" icon 926, a "user management" icon 928, and a "job management" icon 930.

The message display area 940 contains a message display portion 942.

The printer 150 is emitting light based on the visible light communication standard. Then, a suggestion about the operation to be performed by the user, namely, the user operation for directing the mobile terminal 100 and applying visible light to the printer 150, is displayed in the message display portion 942. The message display portion 942 shows, for example, the message "A print job is being received via visible light. Please continue directing the mobile terminal and applying emitted visible light to the light-receiving unit of the printer". The display of this message allows the user to readily understand the operation to be performed.

Figure 10:
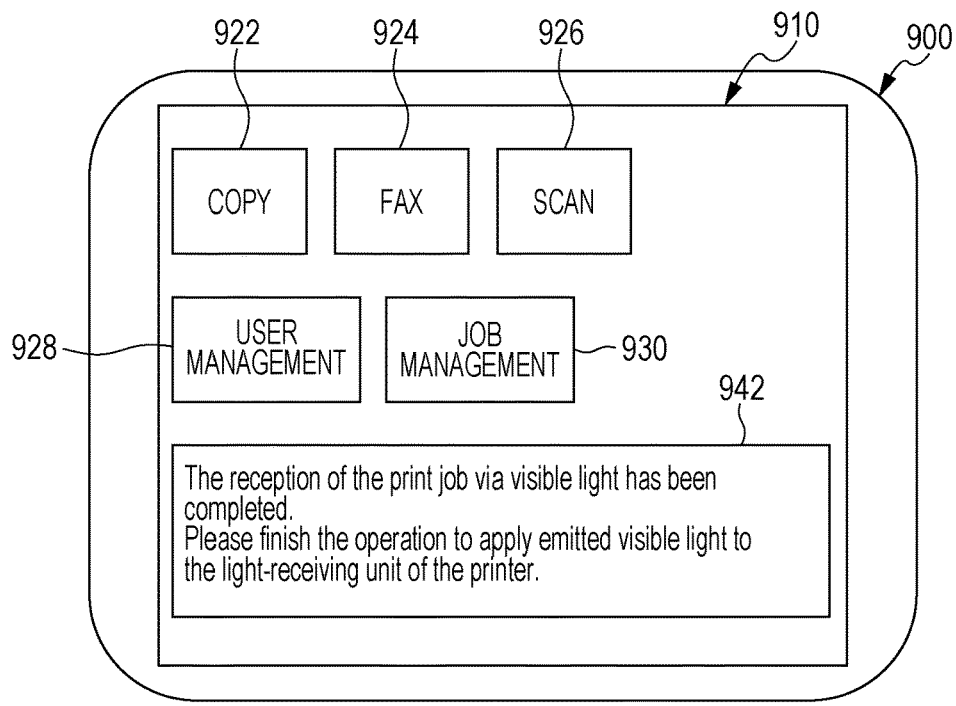
FIG. 10 illustrates an example process according to the exemplary embodiment.

FIG. 10 illustrates an example process (performed by the printer 150) according to this exemplary embodiment. Specifically, an example display in step P416 in the flowchart is illustrated.

When the printer 150 has completed reception of light, a suggestion about the operation to be performed by the user to finish applying visible light to the printer 150, is displayed in the message display portion 942. The message display portion 942 shows, for example, the message "The reception of the print job via visible light has been completed. Please finish the operation to apply emitted visible light to the light-receiving unit of the printer". The display of this message allows the user to readily understand the operation to be performed.

Figure 11:
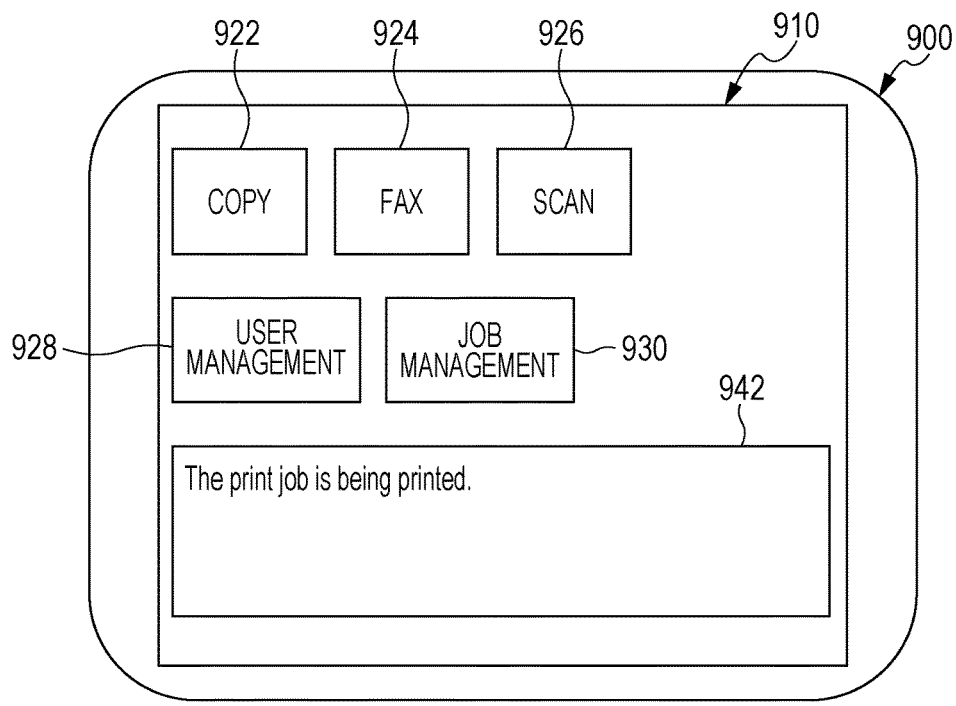
FIG. 11 illustrates an example process according to the exemplary embodiment.

FIG. 11 illustrates an example process (performed by the printer 150) according to this exemplary embodiment. Specifically, an example display in step P420 in the flowchart is illustrated.

The message display portion 942 shows, for example, the message "The print job is being printed". The display of this message allows the user to know the state of the printer 150.

When the printing of the print job has been completed, the message "The print job has been printed" is displayed.

Figure 12:
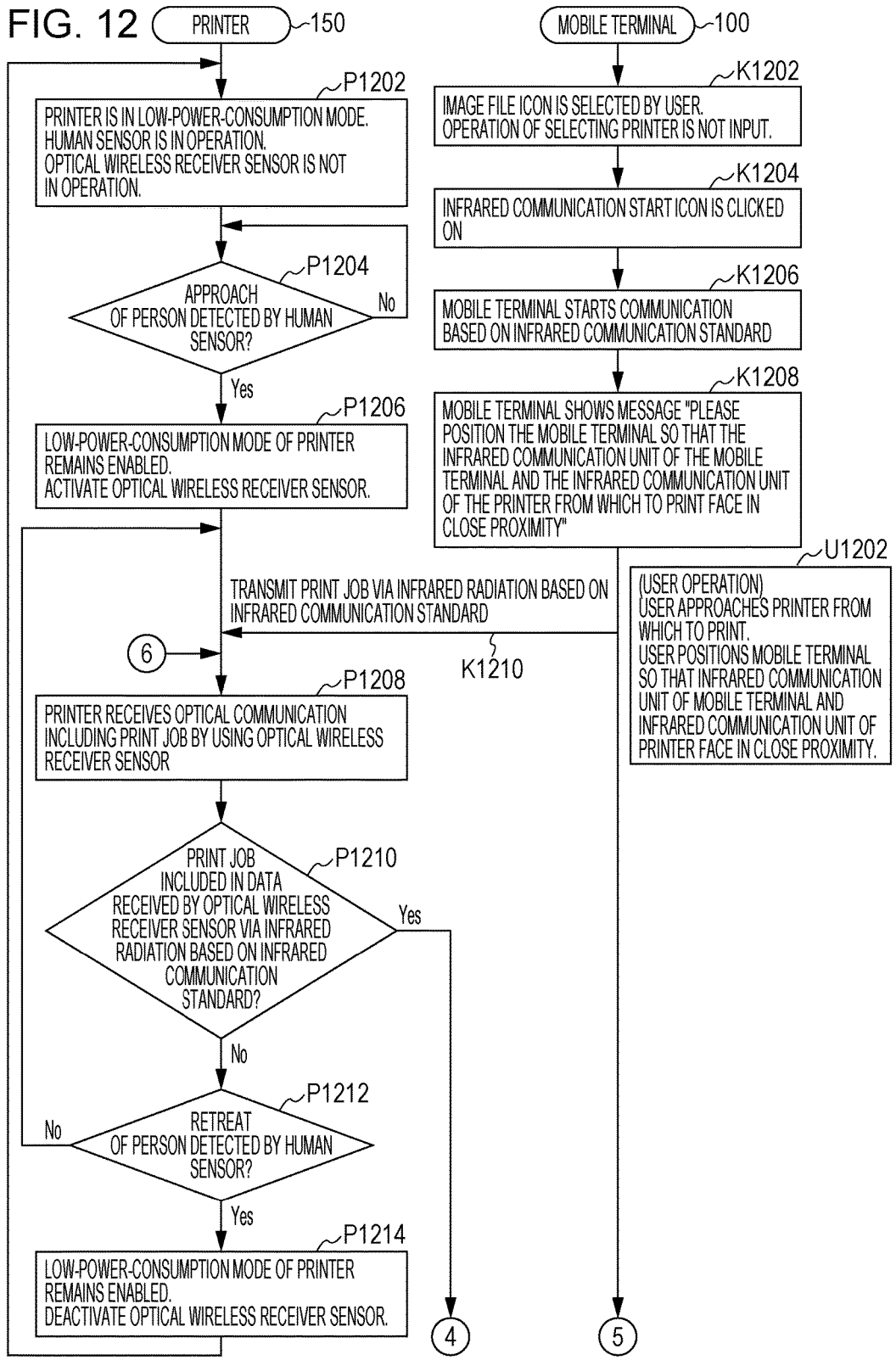
FIG. 12 is a flowchart illustrating an example process according to the exemplary embodiment.
Figure 13:
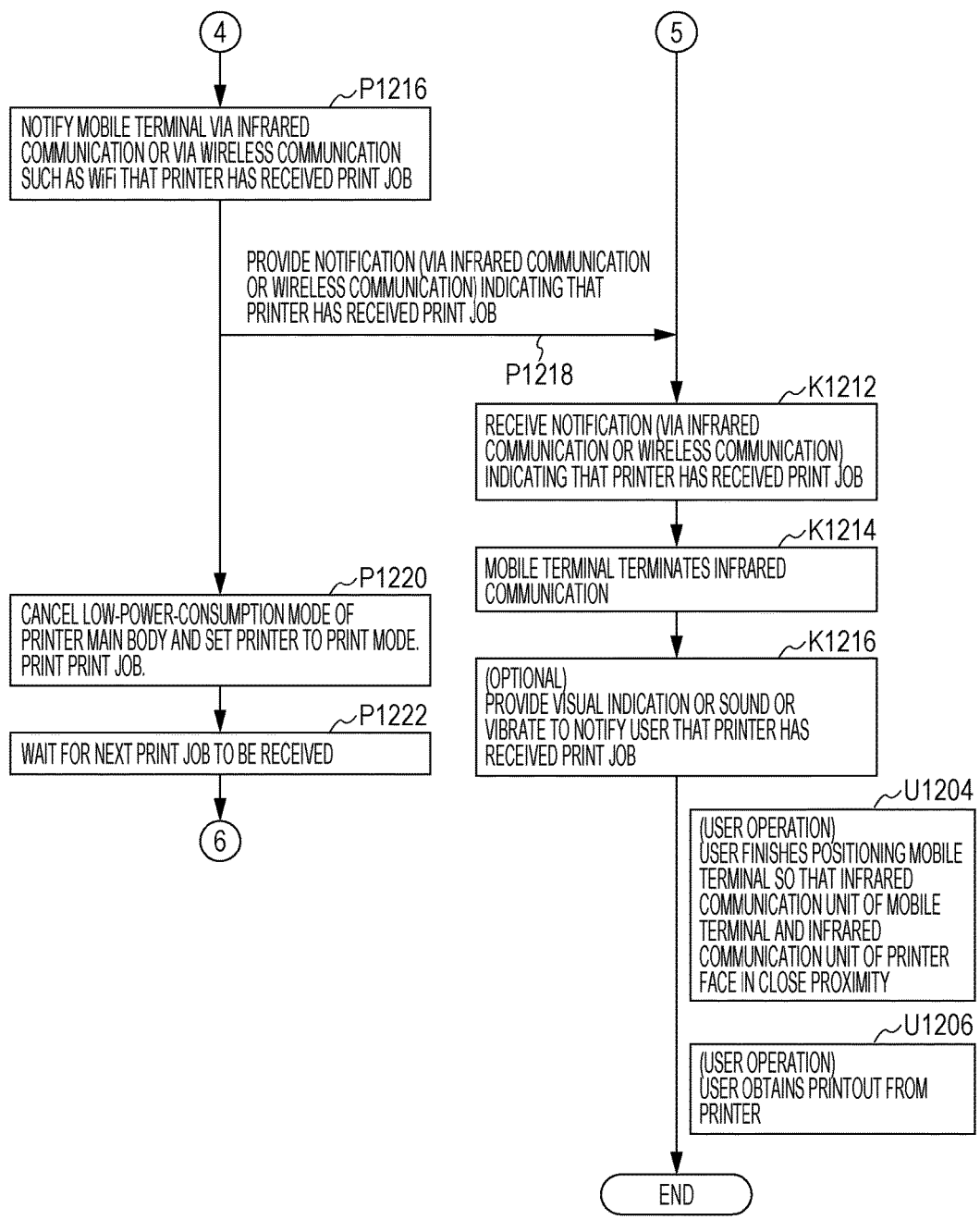
FIG. 13 is a flowchart illustrating the example process according to the exemplary embodiment.

FIGS. 12 and 13 are a flowchart illustrating an example process according to this exemplary embodiment. An example in which infrared communication is used as optical communication is illustrated. The following description will be made in the context of the example illustrated in FIG. 3A. When the example illustrated in FIG. 3B is used, the human sensor 310 may be read as the human sensor function of the human/optical wireless receiver sensor 330 and the optical wireless receiver sensor 320 may be read as the optical communication function of the human/optical wireless receiver sensor 330.

The printer 150 performs the following process.

In step P1202, the printer 150 is in the low-power-consumption mode. The human sensor 310 is in operation. The optical wireless receiver sensor 320 is not in operation. The human sensor 310 is capable of detecting the presence or approach of a person. In the example illustrated in FIG. 3A, the human sensor 310 utilizes infrared radiation, visible light, ultrasonic waves, or the like. In the example illustrated in FIG. 3B, the human sensor 310 utilizes a light beam that is identical to that for use in optical communication (in the illustrated example, infrared radiation).

In step P1204, the printer 150 determines whether or not the human sensor 310 has detected an approach of a person. If an approach of a person has been detected, the process proceeds to step P1206, or otherwise, the printer 150 waits until an approach of a person has been detected. That is, if no person is detected by the human sensor 310, the optical wireless receiver sensor 320 remains not in operation and thus the optical wireless receiver sensor 320 does not accept receipt of a print job. In response to the human sensor 310 detecting a person entering a particular area or detecting a person approaching the printer 150 in a particular area, the printer 150 determines that a person has been detected. The particular area refers to a predetermined area or an area within a predetermined distance.

In step P1206, the low-power-consumption mode of the printer 150 remains enabled. The optical wireless receiver sensor 320 is activated. That is, if the human sensor 310 has detected a person in step P1204, the optical wireless receiver sensor 320 enables acceptance of receipt of a print job.

The process proceeds to step SP1208 upon execution of step K1210.

In step P1208, the printer 150 receives optical communication including a print job by using the optical wireless receiver sensor 320.

In step P1210, the optical wireless receiver sensor 320 receives data via infrared radiation based on the infrared communication standard, and the printer 150 determines whether or not the received data includes a print job. If a print job is included, the process proceeds to step P1216, or otherwise, the process proceeds to step P1212.

In step P1212, the printer 150 determines whether or not the human sensor 310 has detected a retreat of the person. If a retreat of the person has been detected, the process proceeds to step P1214, or otherwise, the process returns to step P1208. If entry of the person into the particular area has not been detected, the printer 150 determines a retreat of the person.

A distance A for detecting an approach of a person and a distance B for detecting a retreat of the person may be the same or different. It is desirable that the distance B, which serves as a threshold, be longer than the distance A. This ensures that reception of infrared communication and transmission of a print job are performed even in a case where, for example, after the printer 150 has emitted infrared radiation in response to a user approaching the printer 150, the user receives infrared communication or transmits a print job at a different position (e.g., at a position that is a step back or at a position just in front of an infrared communication unit of the printer 150), particularly in a case where the user has moved to a position that is further away from the printer 150.

After the detection of a presence of a person, the distance for detecting a presence of a person may be changed. For example, a distance D after detection may be longer than a distance C before detection. This ensures that a print instruction is provided even when another person who has learned that a print instruction can be sent via infrared communication sends a print instruction at a distant position. The distance D may be used within a predetermined period after a print instruction was provided for the first time and thereafter the distance C may be used again. If another print instruction is provided during this period, the period may be initialized. That is, if multiple print instructions have been provided during this period, the distance D may be used within a predetermined period after the last print instruction has been provided, and thereafter the distance C may be used again.

In the foregoing description, distances (the distance A, the distance B, the distance C, and the distance D) are used as thresholds. Alternatively, the sensitivity of the human sensor 310 may be used as a threshold. For example, the sensitivity of the human sensor 310 may be set so that a presence of a distant person is detectable, or the sensitivity of the human sensor 310 may be set so that only a nearby person is detectable.

In step P1214, the low-power-consumption mode of the printer 150 remains enabled. The optical wireless receiver sensor 320 is deactivated. Thereafter, the process returns to step P1202.

In step P1216, the printer 150 notifies the mobile terminal 100 of receipt of the print job. This notification may be provided via infrared communication or via wireless communication such as WiFi.

In step P1218, the printer 150 provides a notification (via infrared communication or wireless communication) indicating that a print job has been received to the mobile terminal 100.

In step P1220, the printer 150 cancels the low-power-consumption mode of the main body thereof and enters the print mode. The printer 150 performs printing in accordance with the print job.

In step P1222, the printer 150 waits for the next print job to be received, and then the process returns to step P1208. Instead of step P1208, the process may be returned to step P1202, step P1204, or step P1206.

On the other hand, the mobile terminal 100 performs the following operation. The operation of the user will also be described which is represented by step U.

In step K1202, an image file icon is selected by the user. The operation of selecting the printer 150 is not input. The mobile terminal 100 may not have registered therein the address of the printer 150. When this exemplary embodiment is not used (or when the related art technique is used), the mobile terminal 100 has registered therein the address of the printer 150. Thus, a large number of printer names (printer names) are displayed in a list of selection options, which may inconvenience the user who is to select the printer 150. In this exemplary embodiment, printing is enabled without registration of the address of the printer 150 to the mobile terminal 100. It is to be understood that the user will not have to select the printer 150 on the display of the mobile terminal 100.

In step K1204, an infrared communication start icon is clicked on. This operation is performed to make an instruction to transmit the image file selected in step K1202.

In step K1206, the mobile terminal 100 starts communication on the basis of the infrared communication standard.

In step K1208, the mobile terminal 100 shows the message "Please position the mobile terminal so that the infrared communication unit of the mobile terminal and the infrared communication unit of the printer from which to print face in close proximity".

In step U1202, the user approaches the printer 150 from which to print. The user positions the mobile terminal 100 so that the infrared communication unit of the mobile terminal 100 and the infrared communication unit of the printer 150 face in close proximity to perform infrared communication.

In step K1210, the mobile terminal 100 transmits a print job to the printer 150 via infrared radiation based on the infrared communication standard.

In this case, the address of the mobile terminal 100 may not necessarily be sent to the printer 150 via WiFi communication. In wireless communication such as WiFi, which requires the mobile terminal 100 and the printer 150 to set up a connection, the address of the mobile terminal 100 is sent to the printer 150 and the printer 150 temporarily stores the address. The address of the mobile terminal 100 is known by the printer 150, which may be a security concern. Since the address of the mobile terminal 100 is not sent to the printer 150, there may be no concern about security.

The process proceeds to step K1212 upon execution of step P1218.

In step K1212, the mobile terminal 100 receives a notification (via infrared communication or wireless communication) indicating that the printer 150 has received the print job.

The notification indicating that the printer 150 has received the print job may not be transmitted via wireless communication. That is, the operations of steps P1216 and P1218 may not be performed. As a result, the operation of step K1212 is also no longer necessary. In this case, the user knows that the print job has been successfully transmitted, by viewing an indication on a user interface of the printer 150. Then, the user performs an operation of finishing transmission from the mobile terminal 100 via infrared radiation. In order to perform communication from the printer 150 to the mobile terminal 100 via wireless communication other than infrared communication, the printer 150 needs to be informed of the address of the mobile terminal 100. Omission of the operations of steps P1216 and P1218 eliminates such a need, and operation is made simple. In addition, there may be no concern about security.

In step K1214, the mobile terminal 100 terminates infrared communication.

In step K1216, the mobile terminal 100 performs a process (such as providing a visual indication or sound or vibrating) to notify the user that the printer 150 has received the print job. The operation of step K1216 may be optional.

Thereafter, the following user operations are performed.

In step U1204, the user finishes positioning the mobile terminal 100 so that the infrared communication unit of the mobile terminal 100 and the infrared communication unit of the printer 150 face in close proximity.

In step U1206, the user obtains a printout from the printer 150.

FIGS. 14 to 19 illustrate example screens on the display of the mobile terminal 100 or the printer 150 when infrared communication is utilized.

Figure 14:
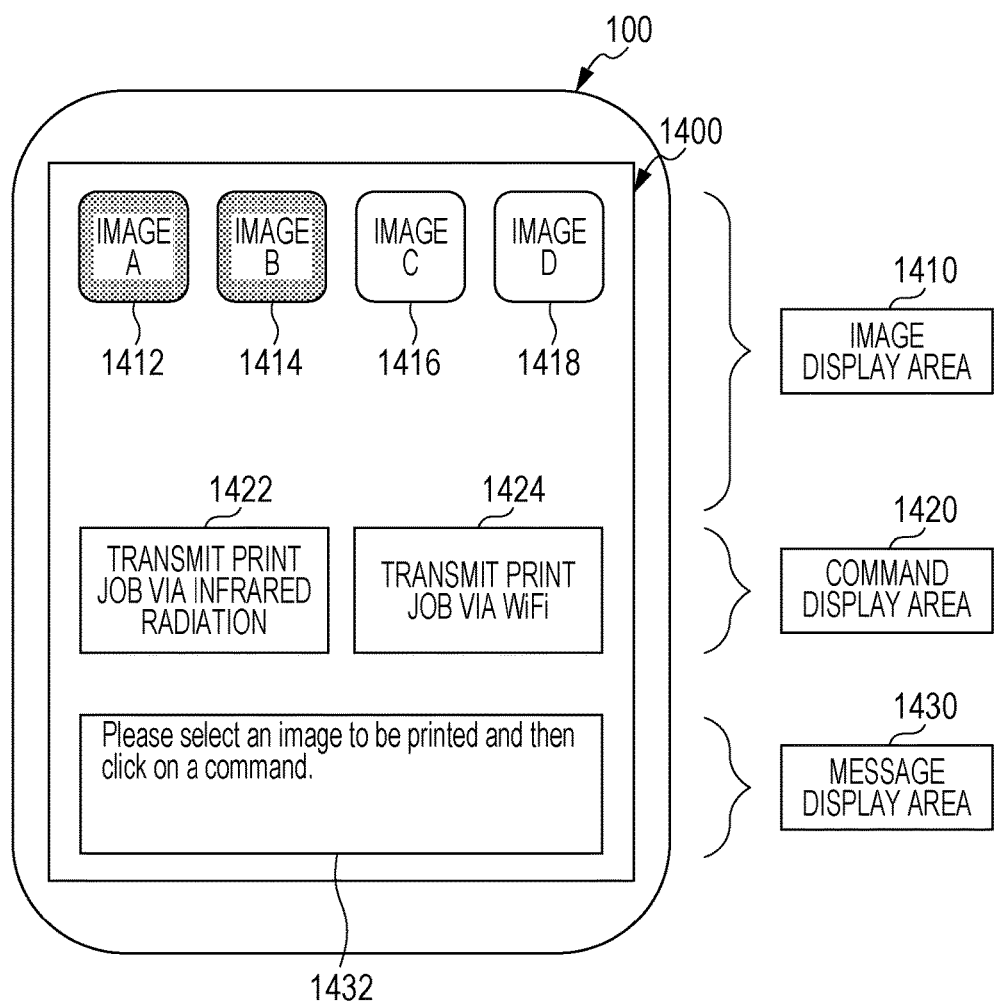
FIG. 14 illustrates an example process according to the exemplary embodiment.

FIG. 14 illustrates an example process (performed by the mobile terminal 100) according to this exemplary embodiment. Specifically, an example display in steps K1202 and K1204 in the flowchart is illustrated.

The mobile terminal 100 includes a display 1400. The content displayed on the display 1400 is illustrated.

The display 1400 has three areas, namely, an image display area 1410, a command display area 1420, and a message display area 1430.

The image display area 1410 shows an "image A" icon 1412, an "image B" icon 1414, an "image C" icon 1416, and an "image D" icon 1418.

The command display area 1420 shows a "Transmit print job via infrared radiation" icon 1422 and a "Transmit print job via WiFi" icon 1424.

The message display area 1430 contains a message display portion 1432. The message display portion 1432 shows, for example, the message "Please select an image to be printed and then click on a command".

The example in FIG. 14 demonstrates that the "image A" icon 1412 and the "image B" icon 1414 have been selected. Thereafter, when the "Transmit print job via infrared radiation" icon 1422 is clicked on, the process transitions to step K1206 in the flowchart.

Figure 15:
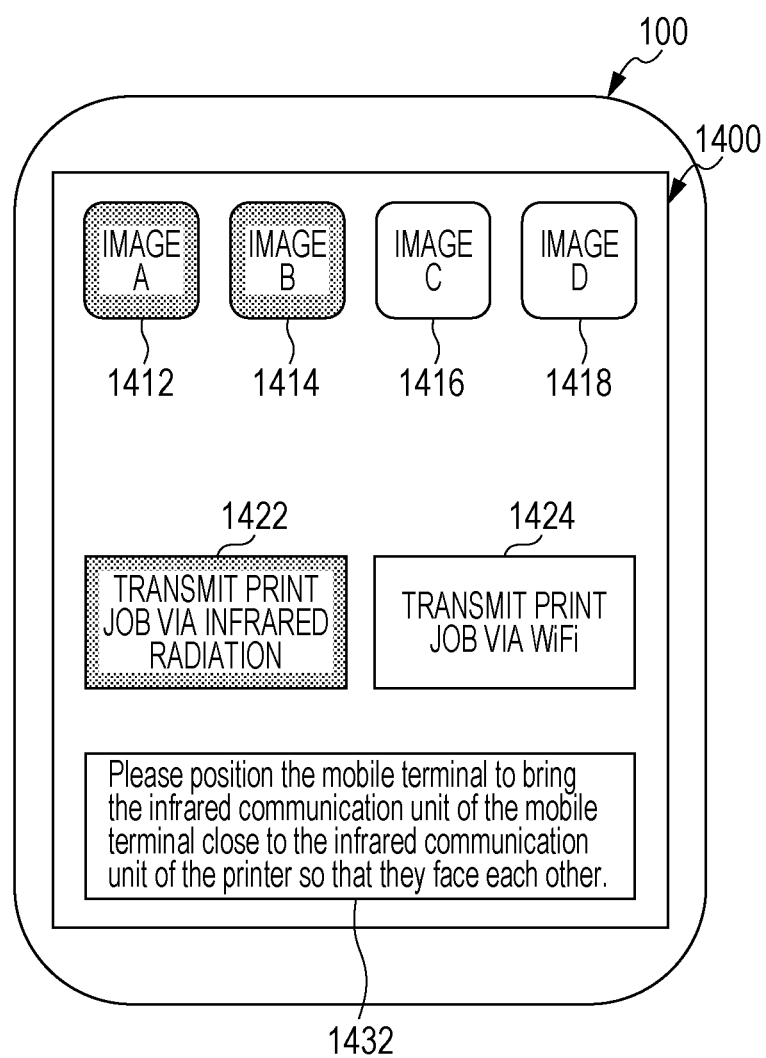
FIG. 15 illustrates an example process according to the exemplary embodiment.

FIG. 15 illustrates an example process (performed by the mobile terminal 100) according to this exemplary embodiment. Specifically, an example display in steps K1206, K1208, and U1202 in the flowchart is illustrated.

The "Transmit print job via infrared radiation" icon 1422 is being selected by user selection.

Upon acceptance of selection of the "Transmit print job via infrared radiation" icon 1422, the mobile terminal 100 starts communication on the basis of the infrared communication standard (step K1206). Then, a suggestion about the operation to be performed by the user to apply infrared radiation to the printer 150 is displayed in the message display portion 1432. The message display portion 1432 shows, for example, the message "Please position the mobile terminal to bring the infrared communication unit of the mobile terminal close to the infrared communication unit of the printer so that they face each other. The display of this message allows the user to readily understand the operation to be performed.

Figure 16:
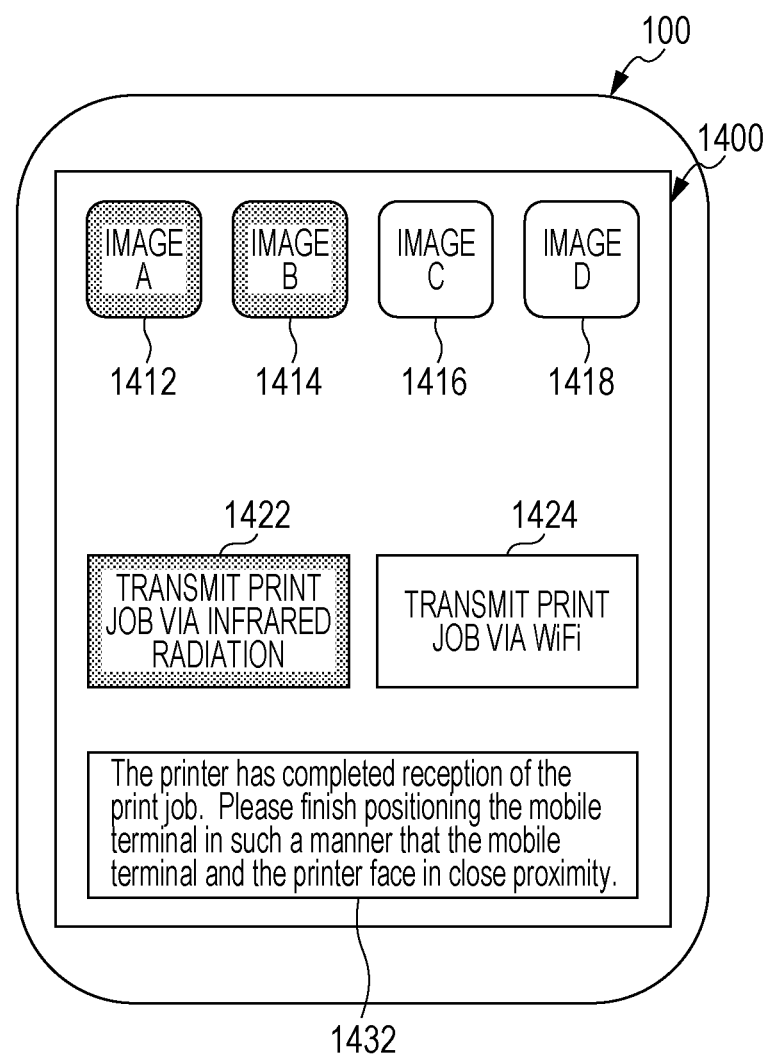
FIG. 16 illustrates an example process according to the exemplary embodiment.

FIG. 16 illustrates an example process (performed by the mobile terminal 100) according to this exemplary embodiment. Specifically, an example display in steps K1212 to K1216 and step U1204 in the flowchart is illustrated.

The "Transmit print job via infrared radiation" icon 1422 is being selected by user selection.

The mobile terminal 100 terminates infrared communication (step K1214). Then, a suggestion about the operation to be performed by the user to finish positioning the mobile terminal 100 so that the mobile terminal 100 and the printer 150 face in close proximity is displayed in the message display portion 1432. The message display portion 1432 shows, for example, the message "The printer has completed reception of the print job. Please finish positioning the mobile terminal in such a manner that the mobile terminal and the printer face in close proximity". The display of this message allows the user to readily understand the operation to be performed.

Figure 17:
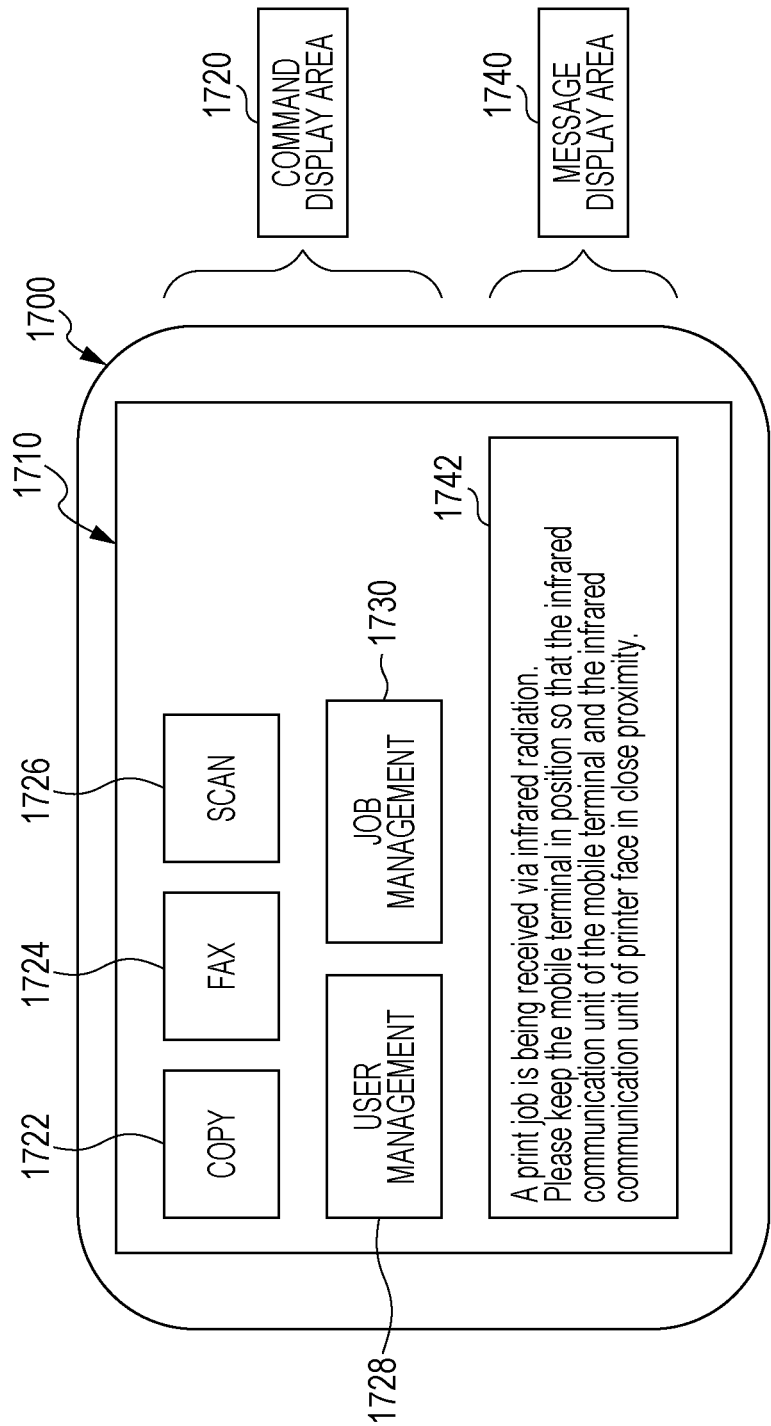
FIG. 17 illustrates an example process according to the exemplary embodiment.

FIG. 17 illustrates an example process (performed by the printer 150) according to this exemplary embodiment. Specifically, an example display in steps P1208 and P1210 in the flowchart is illustrated.

A display device 1700 includes a display 1710.

The display 1710 has a command display area 1720 and a message display area 1740.

The command display area 1720 shows a "copy" icon 1722, a "fax" icon 1724, a "scan" icon 1726, a "user management" icon 1728, and a "job management" icon 1730.

The message display area 1740 contains a message display portion 1742.

The printer 150 is performing communication on the basis of the infrared communication standard. Then, a suggestion about the operation to be performed by the user for positioning the mobile terminal 100 so that the infrared communication unit of the mobile terminal 100 and the infrared communication unit of the printer 150 face in close proximity is displayed in the message display portion 1742. The message display portion 1742 shows, for example, the message "A print job is being received via infrared radiation. Please keep the mobile terminal in position so that the infrared communication unit of the mobile terminal and the infrared communication unit of printer face in close proximity". The display of this message allows the user to readily understand the operation to be performed.

Figure 18:
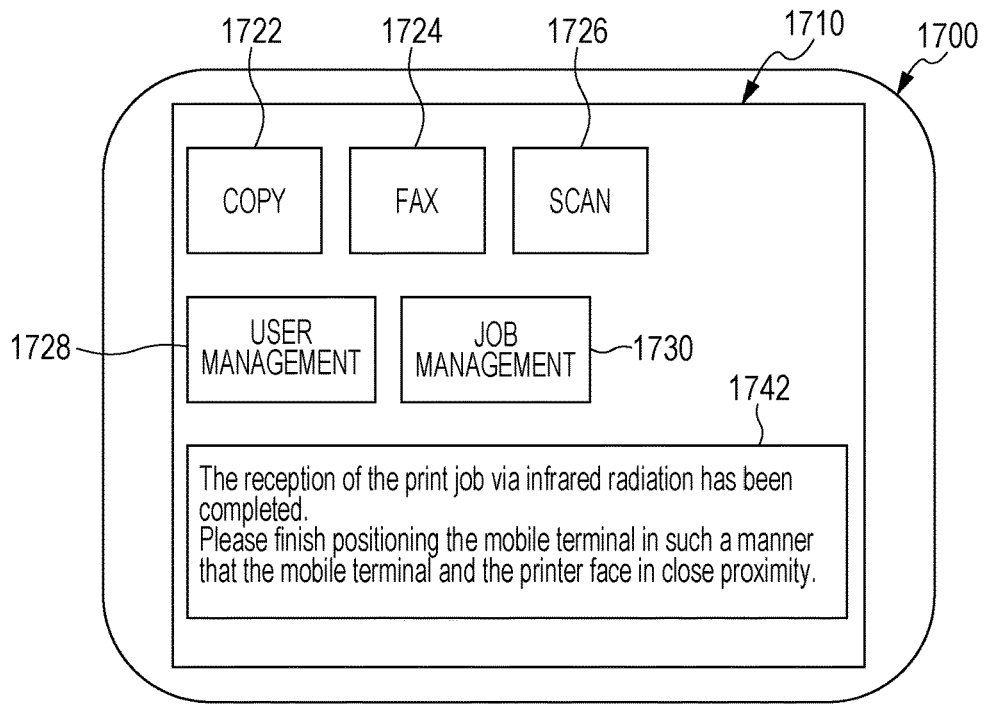
FIG. 18 illustrates an example process according to the exemplary embodiment.

FIG. 18 illustrates an example process (performed by the printer 150) according to this exemplary embodiment. Specifically, an example display in step P1216 in the flowchart is illustrated.

When the printer 150 has completed reception, a suggestion about the operation to be performed by the user to finish positioning the mobile terminal 100 so that the mobile terminal 100 and the printer 150 face in close proximity is displayed in the message display portion 1742. The message display portion 1742 shows, for example, the message "The reception of the print job via infrared radiation has been completed. Please finish positioning the mobile terminal in such a manner that the mobile terminal and the printer face in close proximity". The display of this message allows the user to readily understand the operation to be performed.

Figure 19:
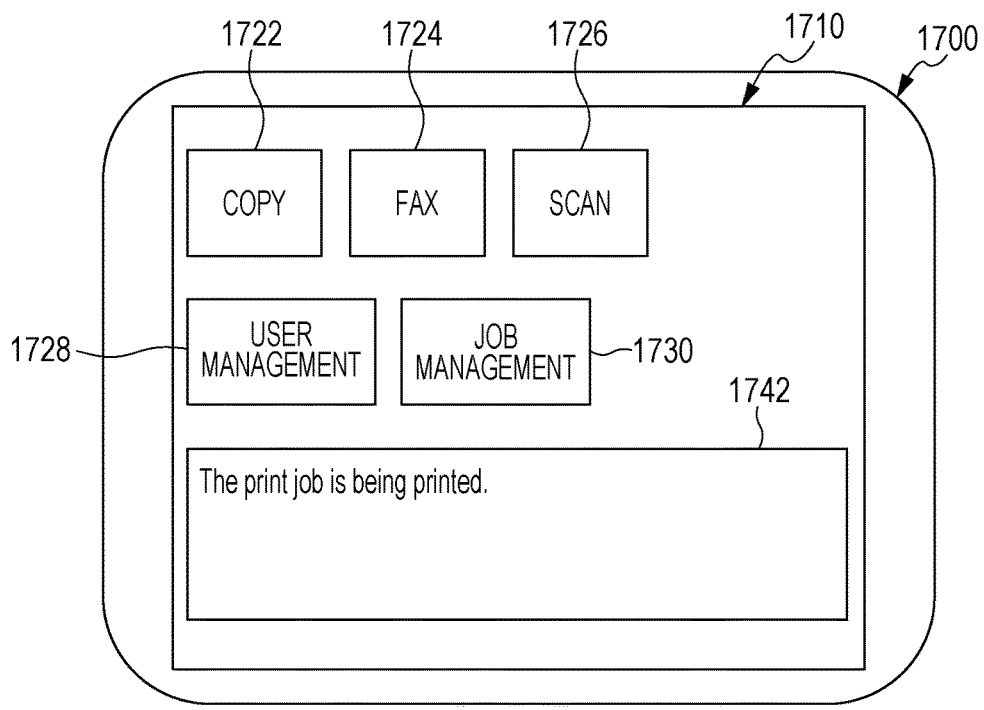
FIG. 19 illustrates an example process according to the exemplary embodiment.

FIG. 19 illustrates an example process (performed by the printer 150) according to this exemplary embodiment. Specifically, an example display in step P1220 in the flowchart is illustrated.

The message display portion 1742 shows, for example, the message "The print job is being printed". The display of this message allows the user to know the state of the printer 150.

When the printing of the print job has been completed, the message "The print job has been printed" is displayed.

An example hardware configuration of the mobile terminal 100 and the printer 150 according to this exemplary embodiment will be described with reference to FIG. 20. The configuration illustrated in FIG. 20 is implemented by a personal computer (PC), for example. An example hardware configuration including a data reading unit 2017, such as a scanner, and a data output unit 2018, such as a printer, is illustrated.

A CPU 2001 is a controller that executes processing in accordance with a computer program describing the execution sequence of the various modules described in the exemplary embodiment described above, namely, the optical wireless transmitting module 105, the receiving module 110, the communication control module 115, the user interface module 120, the optical wireless receiving module 155, the transmitting module 160, the communication control module 165, the user interface module 170, the print control module 175, the printing module 185, and the person detection module 190.

A read only memory (ROM) 2002 stores a program, computation parameters, and other data used by the CPU 2001. A RAM 2003 stores a program to be executed by the CPU 2001 and parameters and the like that change as appropriate in accordance with the executed program. The CPU 2001, the ROM 2002, and the RAM 2003 are connected to one another via a host bus 2004. The host bus 2004 is implemented as, for example, a CPU bus.

The host bus 2004 is connected to an external bus 2006, such as a Peripheral Component Interconnect/Interface (PCI) bus, via a bridge 2005.

A keyboard 2008 and a pointing device 2009, such as a mouse, are devices operated by an operator. A display 2010 may be a liquid crystal display device or a cathode ray tube (CRT) display and displays various information as text and/or image information. The display 2010 may also be a touch screen or any other device having both the functions of the pointing device 2009 and the display 2010.

A hard disk drive (HDD) 2011 has contained therein a hard disk (which may be a flash memory or the like). The HDD 2011 drives the hard disk to record or reproduce information and a program to be executed by the CPU 2001. The hard disk implements the functions of the file storage module 125, the file storage module 180, and so on. Various data, computer programs, and so on are also stored.

A drive 2012 reads data or a program recorded on a removable recording medium 2013 mounted on the drive 2012, such as a magnetic disk, an optical disk, a magneto-optical disk, or a semiconductor memory, and supplies the data or program to the RAM 2003 connected via an interface 2007, the external bus 2006, the bridge 2005, and the host bus 2004. The removable recording medium 2013 is also available as a data recording area.

A connection port 2014 is a port to which an external connection device 2015 is connected, and has a connection part supporting a standard such as Universal Serial Bus (USB) or IEEE 1394. The connection port 2014 is connected to the CPU 2001 and so on via the interface 2007, the external bus 2006, the bridge 2005, the host bus 2004, and so on. A communication unit 2016 is connected to a communication line to execute a process for data communication with external devices. The data reading unit 2017 may be a scanner, for example, and executes a process for reading documents. The data output unit 2018 may be a printer, for example, and executes a process for outputting document data.

The hardware configuration illustrated in FIG. 20 is an example configuration. The configuration according to this exemplary embodiment is not limited to the configuration illustrated in FIG. 20 and may be any configuration that is capable of implementing the modules described above in this exemplary embodiment. For example, some of the modules may be implemented as dedicated hardware (e.g., an application specific integrated circuit (ASIC), etc.), or other modules may be included in an external system and connected via a communication line. Alternatively, multiple systems each illustrated in FIG. 20 may be interconnected via a communication line so as to operate in cooperation with each other.

The program described above may be stored in a recording medium to be provided or may be provided via a communication medium. In this case, for example, the program described above may be implemented as a "computer-readable recording medium storing the program".

The "computer-readable recording medium storing the program" refers to a recording medium readable by a computer and having the program recorded thereon, which is used for installing and executing the program, distributing the program, or any other purpose.

Examples of the recording medium include digital versatile discs (DVDs), such as discs based on standards created by the DVD Forum, namely, "DVD-R, DVD-RW, and DVD-RAM", and discs based on standards created by the DVD+RW Alliance, namely, "DVD+R and DVD+RW", compact discs (CDs), such as a compact disc read-only memory (CD-ROM), a CD-Recordable (CD-R) disc, and a CD-Rewritable (CD-RW) disc, Blu-ray Disc (registered trademark), a magneto-optical (MO) disk, a flexible disk (FD), a magnetic tape, a hard disk, a read-only memory (ROM), an electrically erasable programmable read-only memory (EEPROM (registered trademark)), a flash memory, a RAM, and a secure digital (SD) memory card.

All or part of the program described above may be recorded on the recording medium described above for storage or distribution, for example. Alternatively, all or part of the program described above may be transmitted via communication by using a transmission medium such as a wired network, a wireless communication network, or a combination thereof that is used for a communication architecture such as a LAN, a metropolitan area network (MAN), a wide area network (WAN), the Internet, an intranet, or an extranet, or may be carried on carrier waves.

Additionally, the program described above may be part or all of another program, or may be recorded on a recording medium together with an individual program. Alternatively, the program may be divided into pieces which are recorded on plural recording media. Moreover, the program may be recorded in any form that is restorable, such as in compressed or encrypted form.

The visible light for use in visible light communication according to this exemplary embodiment may be diffused visible light, such as illumination of a ceiling light, or converging visible light, such as illumination of a flashlight. Converging visible light is easier for a user to use than diffused visible light since converging visible light is more easily applied to only the desired destination.

The exemplary embodiment described above may be implemented using the following approaches.

[A1] A mobile information processing apparatus including:
a transmitter that transmits a print instruction to a light-receiving unit of an image output apparatus via visible light communication; and
a providing unit that provides a suggestion about an operation to be performed by a user to apply visible light to the light-receiving unit of the image output apparatus when the print instruction is to be transmitted to the light-receiving unit via the visible light communication.

[A2] An image output apparatus including:
a light-receiving unit;
a receiver that receives, by using the light-receiving unit, a print instruction from a mobile information processing apparatus via visible light communication; and
a providing unit that provides a suggestion about an operation to be performed by a user to apply visible light to the light-receiving unit of the image output apparatus when the print instruction is to be received from the mobile information processing apparatus via the visible light communication.

[A3] An image output system including:
a mobile information processing apparatus; and
an image output apparatus,
the mobile information processing apparatus including
a transmitter that transmits a print instruction to a light-receiving unit of the image output apparatus via visible light communication, and
a providing unit that provides a suggestion about an operation to be performed by a user to apply visible light to the light-receiving unit of the image output apparatus when the print instruction is to be transmitted to the light-receiving unit via the visible light communication,
the image output apparatus including
the light-receiving unit,
a receiver that receives, by using the light-receiving unit, the print instruction from the mobile information processing apparatus via the visible light communication, and
a providing unit that provides a suggestion about an operation to be performed by the user to apply visible light to the image output apparatus when the print instruction is to be received from the mobile information processing apparatus via the visible light communication.

[A4] A mobile information processing apparatus including:
at least one of an imaging light source and a display; and
a transmitter that transmits a print instruction to an image output apparatus via visible light communication using the at least one of an imaging light source and a display.

[A5] The mobile information processing apparatus according to [A4], further including a camera,
wherein the transmitter is oriented in the same or substantially the same direction as the camera.

[A6] The mobile information processing apparatus according to [A5], further including:
an imaging light source; and
a display,
wherein when the transmitter is to transmit the print instruction to the image output apparatus via visible light communication using the imaging light source, an image captured with the camera is displayed on the display.

[A7] An image output system including:
a mobile information processing apparatus; and
an image output apparatus,
the mobile information processing apparatus including
at least one of an imaging light source and a display, and
a transmitter that transmits a print instruction to the image output apparatus via visible light communication using the at least one of an imaging light source and a display,
the image output apparatus including
a receiver that receives the print instruction from the mobile information processing apparatus via the visible light communication.

[A8] The mobile information processing apparatus according to any one of [A1], [A4], [A5] or [A6], wherein the transmitter transmits the print instruction to the image output apparatus without accepting a user operation for selecting the image output apparatus that is a destination of the print instruction.

[A9] The image output apparatus according to [A2], wherein communication settings information on the mobile information processing apparatus that has transmitted the print instruction via the visible light communication is not set.

[A10] The image output apparatus according to [A2] or [A9], wherein information indicating that the receiver has received the print instruction from the mobile information processing apparatus is not transmitted to the mobile information processing apparatus.

[A11] The mobile information processing apparatus according to any one of [A1], [A4], [A5], [A6], or [A8], further including:
a providing unit that provides an indication that the print instruction has been received, when information indicating receipt of the print instruction is received from the image output apparatus.

[A12] The mobile information processing apparatus, the image output apparatus, or the image output system according to any one of [A1] to [A11], wherein converging visible light is used for the visible light communication.

[A13] A non-transitory computer readable medium storing a program causing a computer serving as a mobile information processing apparatus to execute a process for information processing, the process including:
transmitting a print instruction to a light-receiving unit of an image output apparatus via visible light communication; and
providing a suggestion about an operation to be performed by a user to apply visible light to the light-receiving unit of the image output apparatus when the print instruction is to be transmitted to the light-receiving unit via the visible light communication.

[A14] A non-transitory computer readable medium storing a program causing a computer serving as an image output apparatus to execute a process for outputting an image, the process including:
receiving, by using a light-receiving unit of the image output apparatus, a print instruction from a mobile information processing apparatus via visible light communication; and
providing a suggestion about an operation to be performed by a user to apply visible light to the light-receiving unit of the image output apparatus when the print instruction is to be received from the mobile information processing apparatus via the visible light communication.

[A15] A non-transitory computer readable medium storing a program causing a computer serving as a mobile information processing apparatus to execute a process for information processing, the process including:

transmitting a print instruction to an image output apparatus via visible light communication using at least one of an imaging light source and a display, the at least one of an imaging light source and a display being included in the mobile information processing apparatus.

The approaches described above have the following advantages.

In the mobile information processing apparatus according to [A11], it may be possible to transmit a print instruction to a light-receiving unit of an image output apparatus via visible light communication. In addition, the user may readily understand the operation to be performed to transmit a print instruction to the light-receiving unit of the image output apparatus via visible light communication.

In the image output apparatus according to [A2], it may be possible to receive, by using a light-receiving unit thereof, a print instruction from a mobile information processing apparatus via visible light communication. In addition, the user may readily understand the operation to be performed when the light-receiving unit of the image output apparatus is to receive a print instruction via visible light communication.

In the image output system according to [A3], it may be possible to transmit a print instruction from the mobile information processing apparatus to the light-receiving unit of the image output apparatus via visible light communication. In addition, the user may readily understand the operation to be performed to transmit a print instruction to the light-receiving unit of the image output apparatus via visible light communication. Furthermore, the user may readily understand the operation to be performed when the light-receiving unit of the image output apparatus is to receive a print instruction via visible light communication.

In the mobile information processing apparatus according to [A4], it may be possible to transmit a print instruction to an image output apparatus via visible light communication.

In the mobile information processing apparatus according to [A5], it may be possible to dispose the transmitter to be oriented in the same or substantially the same direction as a camera of the mobile information processing apparatus.

In the mobile information processing apparatus according to [A6], it may be possible to display an image captured with the camera on a display of the mobile information processing apparatus when transmission is to be performed via visible light communication.

In the image output system according to [A7], it may be possible to transmit a print instruction from the mobile information processing apparatus to the image output apparatus via visible light communication.

In the mobile information processing apparatus according to [A8], it may be possible to transmit a print instruction to an image output apparatus without accepting a user operation for selecting the image output apparatus that is a destination of the print instruction.

In the image output apparatus according to [A9], it may be possible to prevent communication settings information on a mobile information processing apparatus that has transmitted a print instruction via visible light communication from being set.

In the image output apparatus according to [A10], it may be possible to prevent information indicating that a print instruction has been received from a mobile information processing apparatus from being transmitted to the mobile information processing apparatus.

In the mobile information processing apparatus according to [A11], it may be possible to provide an indication that a print instruction has been received, when information indicating receipt of the print instruction is received from an image output apparatus.

In the mobile information processing apparatus, the image output apparatus, or the image output system according to [A12], it may be possible to use converging visible light for visible light communication.

In the non-transitory computer readable medium according to [A13], it may be possible to transmit a print instruction to a light-receiving unit of an image output apparatus via visible light communication. In addition, the user may readily understand the operation to be performed to transmit a print instruction to the light-receiving unit of the image output apparatus via visible light communication.

In the non-transitory computer readable medium according to [A14], it may be possible to receive, by using a light-receiving unit of an image output apparatus, a print instruction from a mobile information processing apparatus via visible light communication. In addition, the user may readily understand the operation to be performed when the light-receiving unit of the image output apparatus is to receive a print instruction via visible light communication.

In the non-transitory computer readable medium according to [A15], it may be possible to transmit a print instruction to an image output apparatus via visible light communication.

The exemplary embodiment described above may also be implemented using the following approaches.

[B1] A mobile information processing apparatus including:

at least one of an imaging light source and a display;

a transmitter that transmits a print instruction to an image output apparatus via visible light communication using the at least one of an imaging light source and a display; and a providing unit that provides a suggestion about an operation to be performed by a user to apply visible light to a light-receiving unit of the image output apparatus when the print instruction is to be transmitted to the image output apparatus via the visible light communication.

[B2] The mobile information processing apparatus according to [B1], further including a camera, wherein the transmitter is oriented in the same or substantially the same direction as the camera.

[B3] The mobile information processing apparatus according to [B2], further including:

an imaging light source; and a display, wherein when the transmitter is to transmit the print instruction to the image output apparatus via visible light communication using the imaging light source, an image captured with the camera is displayed on the display.

[B4] The mobile information processing apparatus according to any one of [B1] to [B3], wherein the transmitter transmits the print instruction to the image output apparatus without accepting a user operation for selecting the image output apparatus as a destination of the print instruction.

[B5] The mobile information processing apparatus according to any one of [B1] to [B4], further including: a second providing unit that provides an indication that the print instruction has been received, when information indicating receipt of the print instruction is received from the image output apparatus.

[B6] The mobile information processing apparatus according to any one of [B1] to [B5], further including:
a camera; and
a receiver that receives, by using the camera, an image from an image reading device via visible light communication.

[B7] An image output system including:
a mobile information processing apparatus; and
an image output apparatus,
the mobile information processing apparatus including
at least one of an imaging light source and a display,
a transmitter that transmits a print instruction to the image output apparatus via visible light communication using the at least one of an imaging light source and a display, and
a providing unit that provides a suggestion about an operation to be performed by a user to apply visible light to a light-receiving unit of the image output apparatus when the print instruction is to be transmitted to the image output apparatus via the visible light communication,
the image output apparatus including
the light-receiving unit, and
a receiver that receives, by using the light-receiving unit, the print instruction from the mobile information processing apparatus via the visible light communication.

[B8] A non-transitory computer readable medium storing a program causing a computer serving as a mobile information processing apparatus to execute a process for information processing, the process including:
transmitting a print instruction to an image output apparatus via visible light communication using at least one of an imaging light source and a display, the at least one of an imaging light source and a display being included in the mobile information processing apparatus; and
providing a suggestion about an operation to be performed by a user to apply visible light to a light-receiving unit of the image output apparatus when the print instruction is to be transmitted to the image output apparatus via the visible light communication.

The approaches described above have the following advantages.

In the mobile information processing apparatus according to [B1], it may be possible to transmit a print instruction to an image output apparatus via visible light communication using at least one of an imaging light source and a display, the at least one of an imaging light source and a display being included in the mobile information processing apparatus.

In the mobile information processing apparatus according to [B2], it may be possible to dispose the transmitter to be oriented in the same or substantially the same direction as a camera of the mobile information processing apparatus.

In the mobile information processing apparatus according to [B3], it may be possible to display an image captured with the camera on a display of the mobile information processing apparatus when transmission is to be performed via visible light communication.

In the mobile information processing apparatus according to [B4], it may be possible to transmit a print instruction to an image output apparatus without accepting a user operation for selecting the image output apparatus that is a destination of the print instruction.

In the mobile information processing apparatus according to [B5], it may be possible to provide an indication that a print instruction has been received, when information indicating receipt of the print instruction is received from an image output apparatus.

In the mobile information processing apparatus according to [B6], it may be possible to receive, by using a camera included in the mobile information processing apparatus, an image from an image reading device via visible light communication.

In the image output system according to [B7], it may be possible to transmit a print instruction to the image output apparatus via visible light communication using at least one of an imaging light source and a display, the at least one of an imaging light source and a display being included in the mobile information processing apparatus.

In the non-transitory computer readable medium according to [B8], it may be possible to transmit a print instruction to an image output apparatus via visible light communication using at least one of an imaging light source and a display, the at least one of an imaging light source and a display being included in the mobile information processing apparatus.

The exemplary embodiment described above may also be implemented using the following approaches.

[C1] An image output apparatus including:
a receiver that receives a print instruction from a mobile information processing apparatus via visible light communication; and
a transmitter that transmits information indicating receipt of the print instruction to the mobile information processing apparatus via wireless communication different from the visible light communication.

[C2] The image output apparatus according to [C1], further including:
a light-receiving unit; and
a providing unit that provides a suggestion about an operation to be performed by a user to apply visible light to the light-receiving unit of the image output apparatus when the print instruction is to be received from the mobile information processing apparatus via the visible light communication.

[C3] A mobile information processing apparatus including:
a transmitter that transmits a print instruction to an image output apparatus via visible light communication; and
a receiver that receives, from the image output apparatus via wireless communication different from the visible light communication, information indicating receipt of the print instruction.

[C4] The mobile information processing apparatus according to [C3], further including:
a providing unit that provides a suggestion about an operation to be performed by a user to apply visible light to a light-receiving unit of the image output apparatus when the print instruction is to be transmitted to the image output apparatus via the visible light communication.

[C5] An image output system including:
an image output apparatus; and
a mobile information processing apparatus,
the image output apparatus including
a receiver that receives a print instruction from the mobile information processing apparatus via visible light communication, and
a transmitter that transmits information indicating receipt of the print instruction to the mobile information processing apparatus via wireless communication different from the visible light communication, the mobile information processing apparatus including
a transmitter that transmits the print instruction to the image output apparatus via visible light communication, and
a receiver that receives, from the image output apparatus via wireless communication different from the visible light communication, information indicating receipt of the print instruction.

[C6] A non-transitory computer readable medium storing a program causing a computer serving as an image output apparatus to execute a process for outputting an image, the process including:
receiving a print instruction from a mobile information processing apparatus via visible light communication; and
transmitting information indicating receipt of the print instruction to the mobile information processing apparatus via wireless communication different from the visible light communication.

[C7] A non-transitory computer readable medium storing a program causing a computer serving as a mobile information processing apparatus to execute a process for information processing, the process including:
transmitting a print instruction to an image output apparatus via visible light communication; and
receiving, from the image output apparatus via wireless communication different from the visible light communication, information indicating receipt of the print instruction.

The approaches described above have the following advantages.

In the image output apparatus according to [C1], it may be possible to receive a print instruction from a mobile information processing apparatus via visible light communication, and it may also be possible to transmit information indicating receipt of the print instruction to the mobile information processing apparatus via wireless communication different from the visible light communication.

In the image output apparatus according to [C2], the user may readily understand the operation to be performed when a print instruction is to be received from the mobile information processing apparatus via visible light communication.

In the mobile information processing apparatus according to [C3], it may be possible to transmit a print instruction to an image output apparatus via visible light communication, and it may also be possible to receive, from the image output apparatus via wireless communication different from the visible light communication, information indicating receipt of the print instruction.

In the mobile information processing apparatus according to [C4], the user may readily understand the operation to be performed to transmit a print instruction to an image output apparatus via visible light communication.

In the image output system according to [C5], it may be possible to receive a print instruction from a mobile information processing apparatus via visible light communication, and it may also be possible to transmit information indicating receipt of the print instruction to the mobile information processing apparatus via wireless communication different from the visible light communication.

In the non-transitory computer readable medium according to [C6], it may be possible to receive a print instruction from a mobile information processing apparatus via visible light communication, and it may also be possible to transmit information indicating receipt of the print instruction to the mobile information processing apparatus via wireless communication different from the visible light communication.

In the non-transitory computer readable medium according to [C7], it may be possible to transmit a print instruction to an image output apparatus via visible light communication, and it may also be possible to receive, from the image output apparatus via wireless communication different from the visible light communication, information indicating receipt of the print instruction.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A printer comprising:
one or more optical sensors that detect a person, the one or more optical sensors also receiving an optical communication from a mobile information processing apparatus, wherein
a reception capability of the one or more optical sensors is deactivated such that the one or more optical sensors cannot receive the optical communication when no person is detected by the one or more optical sensors.

2. The printer according to claim 1, wherein
the one or more optical sensors enable reception of the optical communication in response to the one or more optical sensors detecting a person.

3. A printer comprising:
one or more optical sensors that detect a person, the one or more optical sensors also receiving an optical communication including a print instruction from a mobile information processing apparatus; and
a printing module that performs printing in accordance with the print instruction,
wherein a reception capability of the one or more optical sensors is deactivated such that the one or more optical sensors cannot receive the print instruction when no person is detected by the one or more optical sensors.

4. The printer according to claim 3, wherein
the one or more optical sensors enable reception of the print instruction in response to the one or more optical sensors detecting a person.

5. The printer according to claim 3, further comprising:
a processor programmed to provide a suggestion about an operation to be performed by a user when the print instruction is to be received via the optical communication.

6. The printer according to claim 3, wherein
communication settings information on the mobile information processing apparatus that has transmitted the print instruction via the optical communication is not set.

7. The printer according to claim 3, wherein
information indicating that the one or more optical sensors have received the print instruction from the mobile information processing apparatus is not transmitted to the mobile information processing apparatus.

8. The printer according to claim 3, further comprising:
a processor, wherein
the processor is programmed to transmit information indicating that the one or more optical sensors have received the print instruction from the mobile information processing apparatus to the mobile information processing apparatus via wireless communication different from the optical communication.

9. The printer according to claim 3, wherein
the print instruction includes a print job, the optical communication being at least one of a visible light communication and an infrared communication,
the reception capability of the one or more optical sensors is activated such that the one or more optical sensors can receive the optical communication when the person is detected by the one or more optical sensors, and
when the print job is included in the received optical communication, the printer notifies the mobile information processing apparatus of receipt of the optical communication and performs the print job.

10. A non-transitory computer readable medium storing a program causing a computer of a printer to execute a process for information processing, the process comprising:
detecting a person using one or more optical sensors; and
receiving, by the one or more optical sensors, an optical communication from a mobile information processing apparatus, wherein
a reception capability of the one or more optical sensors is deactivated such that the optical communication cannot be received when no person is detected.

11. The printer according to claim 1, wherein
the optical communication includes a print job, the optical communication being at least one of a visible light communication and an infrared communication,
the reception capability of the one or more optical sensors is activated such that the one or more optical sensors can receive the optical communication when the person is detected by the one or more optical sensors, and
when the print job is included in the received optical communication, the printer notifies the mobile information processing apparatus of receipt of the optical communication and performs the print job.

12. The non-transitory computer readable medium according to claim 10, wherein
the optical communication includes a print job, the optical communication being at least one of a visible light communication and an infrared communication,
the reception capability of the one or more optical sensors is activated such that the optical communication can be received when the person is detected, and
when the print job is included in the received optical communication, the printer notifies the mobile information processing apparatus of receipt of the optical communication and performs the print job.

* * * * *